(12) United States Patent
Gouzenko

(10) Patent No.: US 10,967,220 B2
(45) Date of Patent: Apr. 6, 2021

(54) EXERCISE DEVICE

(71) Applicant: Alexander Gouzenko, Fort Lee, NJ (US)

(72) Inventor: Alexander Gouzenko, Fort Lee, NJ (US)

( * ) Notice: Subject to any disclaimer, the term of this patent is extended or adjusted under 35 U.S.C. 154(b) by 19 days.

(21) Appl. No.: 16/221,535

(22) Filed: Dec. 16, 2018

(65) Prior Publication Data

US 2019/0184227 A1 Jun. 20, 2019

Related U.S. Application Data

(60) Provisional application No. 62/682,959, filed on Jun. 10, 2018, provisional application No. 62/607,352, filed on Dec. 19, 2017.

(51) Int. Cl.
*A63B 22/16* (2006.01)
*A63B 69/18* (2006.01)
(Continued)

(52) U.S. Cl.
CPC ............. *A63B 22/16* (2013.01); *A63B 22/14* (2013.01); *A63B 69/18* (2013.01); *A63G 23/00* (2013.01); *A63B 2022/0033* (2013.01)

(58) Field of Classification Search
CPC ..... A63B 21/02; A63B 21/023; A63B 21/025; A63B 21/026; A63B 21/027; A63B 21/05;
(Continued)

(56) References Cited

U.S. PATENT DOCUMENTS 1,565,484 A 12/1925 McWhirter
2,714,007 A 8/1951 Jordan
(Continued)

FOREIGN PATENT DOCUMENTS

| JP | 2015167849 | 9/2015 | |
|---|---|---|---|
| KR | WO 2016024851 | 2/2016 | |
| WO | WO-2016024851 A1 * | 2/2016 | ............. A63B 22/14 |

OTHER PUBLICATIONS

X Games Snowboarder Operators Manuel Date Unknown, not admitted prior art.
(Continued)

*Primary Examiner* — Garrett K Atkinson
*Assistant Examiner* — Zachary T Moore
(74) *Attorney, Agent, or Firm* — Michael E. Zall

(57) ABSTRACT

A multipurpose exercise device having a base that rests on a support surface and a user platform upon which the user stands. The lower end of a perpendicular support post is mounted to the base to axially pivot thereon and the upper end of the post is pivotally mounted to the lower surface of the user platform. The user platform pivots with the support post in a horizontal plane parallel to the support surface and pivots on the support post in a vertical plane perpendicular to the horizontal support surface. Resistance elements are provided having one end mounted to the support post and the other end mounted to the base to control the velocity and angle of pivot of the user platform in the horizontal plane. Preferably, a plurality of resistance elements are provided having one end mounted to the base and the other end mounted to the user platform to control the velocity and angle of pivot of the user platform in the vertical plane. In use, the user stands on the user platform and performs exercise motions to propel the user platform to pivot in the horizontal plane and the vertical plane.

9 Claims, 26 Drawing Sheets

(51) Int. Cl.
*A63B 22/14* (2006.01)
*A63G 23/00* (2006.01)
*A63B 22/00* (2006.01)

(58) Field of Classification Search
CPC ....... A63B 21/055; A63B 22/14; A63B 22/16; A63B 22/18; A63B 2022/185
See application file for complete search history.

(56) References Cited

U.S. PATENT DOCUMENTS

| | | | |
|---|---|---|---|
| 3,791,645 A | 2/1974 | Stelma | |
| 4,376,532 A | 3/1983 | Hunstad | |
| 4,509,743 A * | 4/1985 | Lie | A63B 69/18 482/71 |
| 4,739,986 A | 4/1988 | Kucharik | |
| 4,946,160 A * | 8/1990 | Bertoletti | A63B 22/18 482/146 |
| 4,966,364 A | 10/1990 | Eggenberger | |
| 5,002,272 A | 3/1991 | Hofmeister | |
| 5,062,629 A | 11/1991 | Vaughan | |
| 5,147,257 A | 9/1992 | Loane | |
| 5,284,460 A | 2/1994 | Miller et al. | |
| 5,509,871 A | 4/1996 | Giovanni | |
| 6,413,197 B2 | 7/2002 | McKechnie | |
| 6,428,451 B1 * | 8/2002 | Hall | A63B 22/18 482/146 |
| 6,514,180 B1 | 2/2003 | Rawls | |
| 7,081,075 B2 * | 7/2006 | Sachs | A63B 26/003 482/146 |
| 7,344,483 B2 | 3/2008 | Tacconi | |
| 7,614,987 B2 | 11/2009 | Guadagno | |
| 7,959,544 B2 | 6/2011 | Palmer | |
| 8,979,722 B2 * | 3/2015 | Klein | A63F 13/245 482/146 |
| 9,205,298 B2 | 12/2015 | Hockridge et al. | |
| 2002/0077231 A1 | 6/2002 | Dulebout | |
| 2003/0166434 A1 | 9/2003 | Lopez-Santiliana et al. | |
| 2009/0176631 A1 | 7/2009 | Blessing | |
| 2009/0227426 A1 * | 9/2009 | Dubar | A63B 69/0093 482/34 |
| 2014/0155236 A1 | 6/2014 | Curry | |
| 2015/0328497 A1 * | 11/2015 | Doucot | A63B 21/00181 482/146 |
| 2018/0193693 A1 * | 7/2018 | Youm | G01L 5/00 |

OTHER PUBLICATIONS https://skiersedge.com/products/ Technical ski conditioner (NPL1).
https://youtu.be/3u8d7UUWytc Skiers Edge Technical ski conditioner You Tube video (NPL2).
https://stepsscarve.com/ Step Carve website (NPL3).

* cited by examiner

FIG. 26
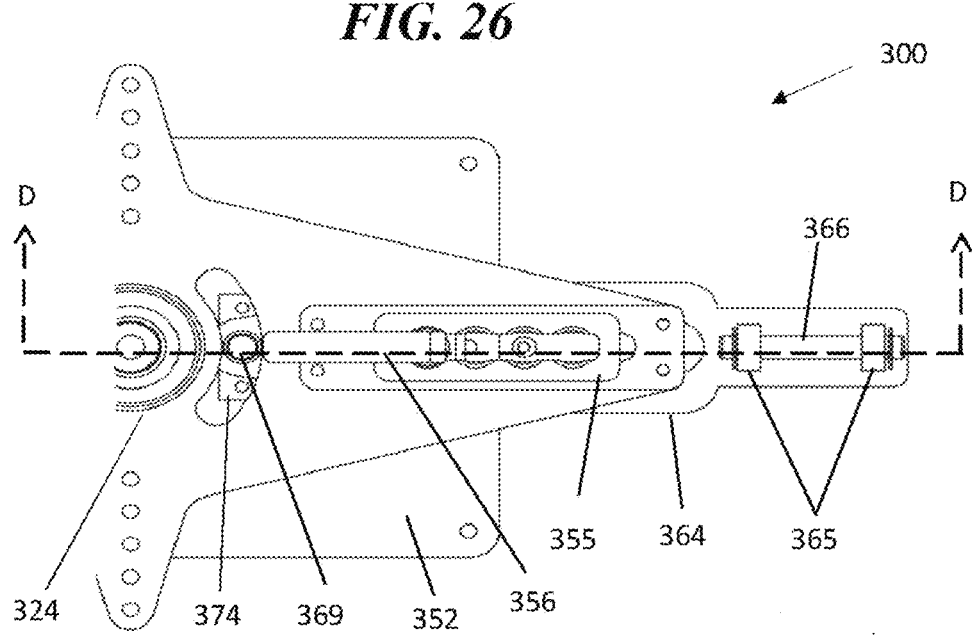
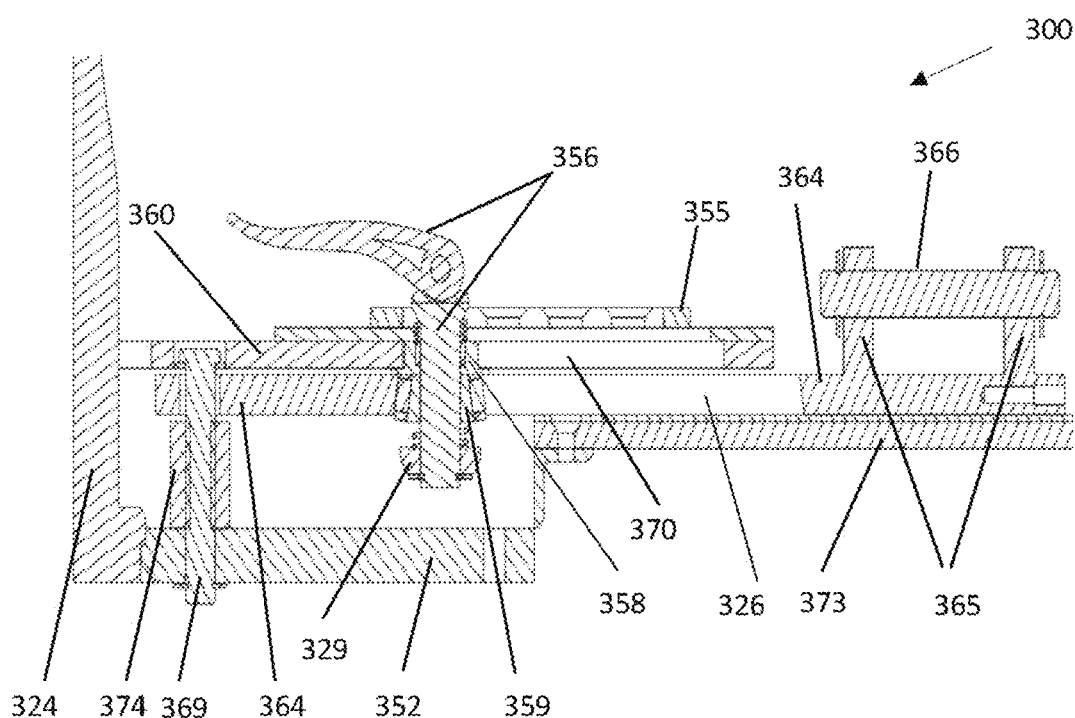
Section D-D

EXERCISE DEVICE

RELATED APPLICATIONS

This application claims priority of provisional applications 62/682,959 filed on Jun. 10, 2018 and U.S. Ser. No. 62/607,352 filed on Dec. 19, 2017. The entire disclosures of these applications are incorporated herein by reference.

SPECIFICATION

Field of the Invention

This invention relates to a multipurpose exercise device used to simulate the movements and motions of athletes in sports, for example, skiers, snowboarders, skateboarders, surfers, kite boarders, water skiers, wake-boarders. The exercise device may be used in training by motion sports athletes and by other recreational athletes. It can also be used in medicine and physical therapy and may be coupled or integrated into a CPU (Computer Processing Unit), computer, game console, Virtual Reality glasses, tablets, and/or video monitor to allow for an interactive experience.

Background of the Invention

The following references may be relevant to this invention:
U.S. Pat. No. 1,565,484 to McWhirter
U.S. Pat. No. 2,714,007 to Jordan
U.S. Pat. No. 3,791,645 to Stelma
U.S. Pat. No. 4,376,532 to Hunstad
U.S. Pat. No. 4,739,986 to Kucharik
U.S. Pat. No. 4,966,364 to Eggenberger
U.S. Pat. No. 5,002,272 to Hofmeister
U.S. Pat. No. 5,062,629 to Vaughan
U.S. Pat. No. 5,147,257 to Loane
U.S. Pat. No. 5,509,871 to Giovanni
U.S. Pat. No. 6,413,197 to McKechnie
U.S. Pat. No. 7,344,483 to Tacconi
U.S. Pat. No. 7,614,987 to Guadagno
U.S. Pat. No. 7,959,544 to Palmer
US 2009/0176631 to Blessing
US 2014/0155236 to Curry.
JP 2015-167849 to Shigeo
The following non-patent references may or may not be effective prior art.
https://skiersedge.com/products/
 Technical ski conditioner (NPL1)
https:/youtu.be/3u8d7UUWytc
 Skiers Edge Technical ski conditioner You Tube video (NPL2)
https://stepsscarve.com/
 Step Carve website (NPL3)

SUMMARY OF THE INVENTION

The exercise device of this invention is a multipurpose exercise device used to replicate the movements and motions of athletes in several sports. The exercise device may be used in training, physical therapy and medicine. A broad segment of the population can use the device for many purposes. For example, the device users can utilize it to improve their general level of fitness, physical health and balance, and to exercise major groups of muscles, e.g., abs, lateral abdominal muscles, "quads" (quadriceps), "glutes" (gluteal muscles) and calves.

The exercise device of this invention is particularly useful for "motion sport" athletes, such as skiers, snowboarders, skateboarders, surfers, kite boarders, water skiers, wake boarders, etc. The exercise device can help them to improve balance, retain or enhance strength and improve muscles that are utilized in the sports.

The exercise device of this invention is also useful, under a medical practitioner's guidance, for improving balance, muscle and joint strength and to treat certain medical and neurological disorders, such as vertigo, dizziness, Parkinson's disease, multiple sclerosis, stroke recovery, etc.

Additionally, the exercise device of this invention may be coupled with or integrated with a video or internet game for dual purpose of playing the game and at the same time engaging in exercises to improve the individual's level of fitness.

Broadly the exercise device of this invention includes a stable base that rests on a substantially horizontal support surface, e.g., floor, lawn, etc. A support post is mounted to the top of the base and a user platform is mounted to the top of the support post. The exercise device of this invention uses a synergistic balance of resistance elements (e.g., dampers, pistons, elastic bands, springs, or other types of resistance as further described herein) and pivot points to create a smooth, realistic simulation of the real world movements in specific sports activities. The user's body is positioned on the user platform and the location and action of the user's feet and body determine the motions of the user platform to provide the desired exercise movements.

More specifically, the exercise device of this invention comprises a base having an upper surface and lower surface, the lower surface resting on a substantially horizontal support surface. A user platform is provided having a lower surface and an upper surface upon which the user stands. A substantially perpendicular support post is also provided and consists of a vertical column at the lower end and cross bar section with vertical pivots at the upper end. The lower end of the support post is mounted to the base to axially pivot on the base. The lower surface of the user platform is mounted to vertical pivots in the upper end of the support post. The user platform thus pivots with the support post in a horizontal plane parallel to the horizontal support surface. Additionally, the user platform pivots on the support post in a vertical plane perpendicular to the horizontal support surface. A plurality of elongated resistance elements having a first end and a second end are provided. The first end is mounted to the support post and the second end is mounted to the base to control the resistance, velocity and angle of pivot of the user platform in the horizontal plane. Optionally, at least one of the resistance elements is adjustable to further control the resistance, velocity and angle of pivot of the user platform in the horizontal plane. Optionally, at least one dampening element is provided having a first end and a second end, the first end is mounted to the support post and the second end is mounted to the base to control the resistance, velocity and angle of pivot of the user platform in the horizontal plane. Preferably a plurality of adjustable elongated resistance elements having a first end and a second end are provided with the first end mounted to the base or support post and the second end mounted to the user platform to control the resistance, velocity and angle of pivot of the user platform in the vertical plane. In use, the user stands on the upper surface of the user platform and performs exercise motions to propel the user platform to pivot in the horizontal plane and the vertical plane.

Other features and advantages of the present invention will become apparent from the following more detailed

BRIEF DESCRIPTION OF THE DRAWINGS

Further aspects, features and advantages of the present invention will become even more apparent with reference to the following detailed description and the accompanying drawings.

FIGS. 17 through 30 illustrate an embodiment of the exercise device 300 of this invention, which includes the same components as embodiment 200, except the exercise device does not include vertical resistance springs 221 to control the resistance to vertical pivot or tilt of the user platform 346 about the support post 340 and around the horizontal axis A-A (see FIG. 2). Instead of such vertical resistance springs 221, in this embodiment 300 the vertical pivot of the user-platform 346 around the horizontal axis A-A is controlled by a linkage mechanism described herein.

FIGS. 30-34 show several embodiments of the exercise device of this invention 400 illustrating various alternative adjustable linkage mechanisms to control the angle of the lateral tilt or pivot of the user-platform 446 around the horizontal axis A-A (i.e., to control the angle of pivot of the user platform 446 in the vertical plane).

The drawings are not presented to scale but are only used to illustrate the principles of the invention. In the drawings, like reference numbers indicate like elements.

DETAILED DESCRIPTION OF THE INVENTION

FIGS. 1-7 Schematic

Figure 1:
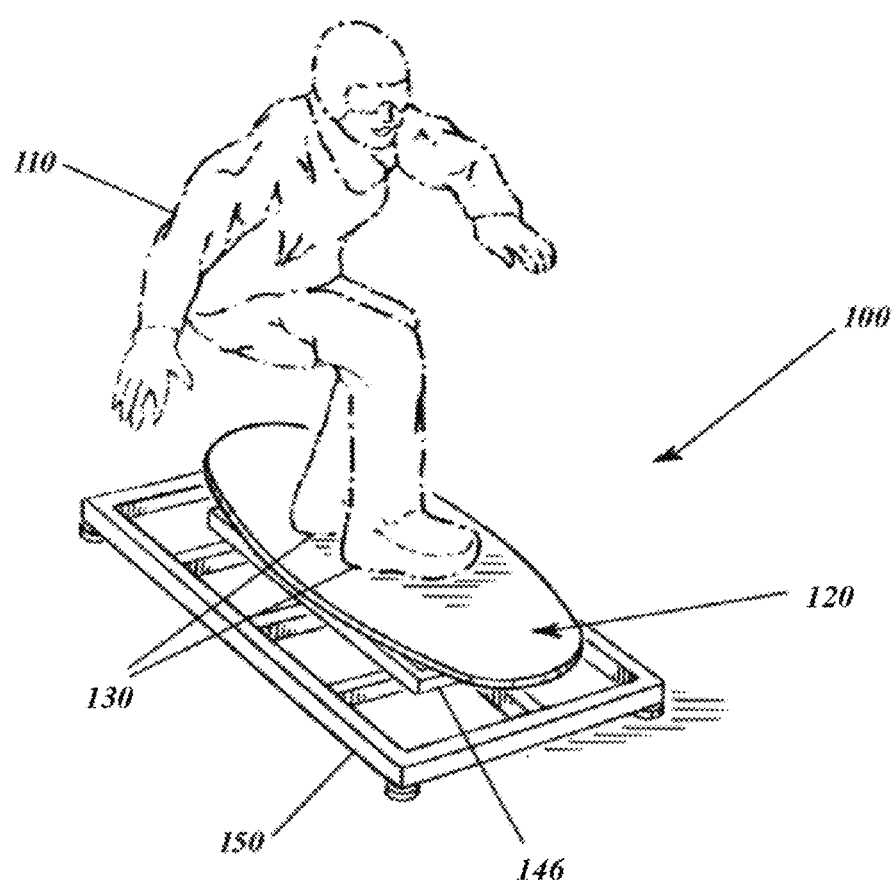
FIG. 1 is a perspective schematic representation of the exercise device 100 of the present invention showing a user 110 positioned on a user board 120, that is mounted on top of a user platform 146 which in turn is mounted to a base 150 that rests on a substantially horizontal support surface.
Figure 2:
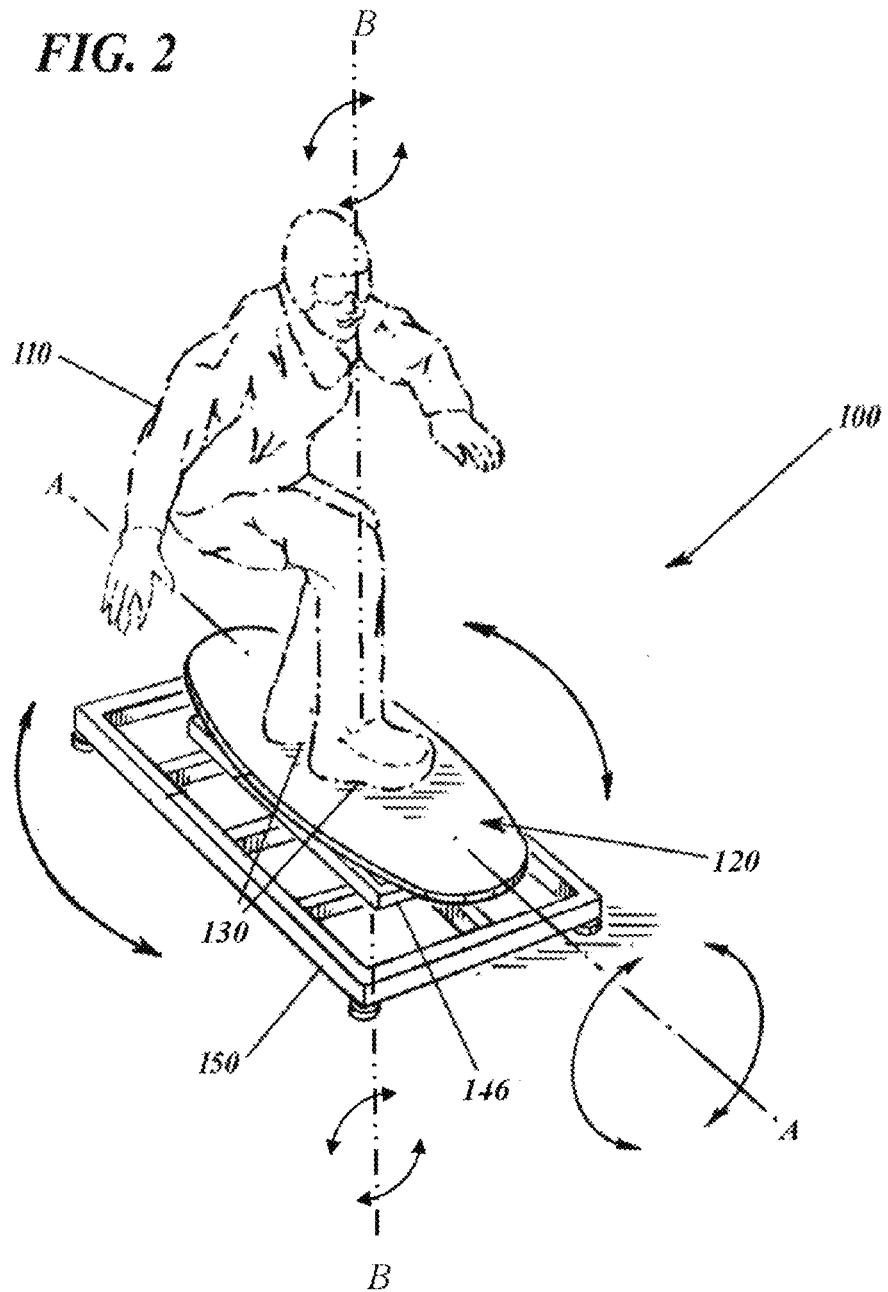
FIG. 2 is a view similar to FIG. 1 wherein the range of movements and articulation of the exercise device 100 have been added, i.e. vertical pivot around the horizontal axis A-A and horizontal pivot around the vertical axis B-B.

The broad concept and principles of the exercise device of the present invention can be seen schematically in FIGS. 1 through 7. The exercise device 100 is a multipurpose exercise device for replicating exercise motions for a user for a plurality of sports and physical therapy. Referring to FIGS. 1 and 2, the exercise device 100 includes a base 150 that rests on a surface, e.g., floor, lawn, etc. The exercise device has a user platform 146 that is mounted to the top of the base 150. The user platform 146 has a lower surface and an upper surface. The lower surface of the user platform 146 is mounted to the upper surface of the base by a support post (not shown). The support post permits the user platform to pivot around the support post in a horizontal plane (i.e. parallel to the horizontal support surface the base 150 rests upon) and vertical plane (i.e. perpendicular to the horizontal support surface). A user board 120 (as shown in FIGS. 1-7) or ski module (as further described herein) can be mounted on top of the user platform 146. The user platform 146, user board 120 and ski module can be designed in various shapes and forms (e.g. in the shape of a snowboard, wakeboard etc)

to simulate a variety of sports, e.g., snow-sports, water-sports, land-based sports. In use, the user stands on top of the user platform, for example in foot mounts 130 that may be mounted directly on the user board 120 or on the user platform 146. The foot mounts 130 can also take different shapes or forms and can be simple footplates or placeholders made from materials that prevent slippage, or they can be mounts for ski-boots, snow-board boots and water ski foot inserts.

It should be understood that the use of the term user board and user platform in describing FIGS. 1-7 are used to emphasize the fact that this invention contemplates the use of one or a of plurality of platforms that can be mounted on top of the support post. These platforms may contains electronic and digital components therein (or thereon) for use with the exercise device, there may be a mid-platform that is designed for cushioning or structural support and there may be a mid-platform that provides another degree of horizontal (or even vertical) pivoting to the exercise device. This invention does not exclude these possibilities for a platform. However, for the sake of brevity this application uses the term user platform most of the time to discuss the relationship of the platform(s) with the remaining elements of the exercise device 100.

The user's 110 body positions on the user board 120 and the location and action of the user's feet on foot mounts 130 and body motion determine the motions and coaction, and propel the user platform 146, user board 120 and the support post (not shown) to provide the desired exercise motions. The user platform 146, user board 120 and the support post (not shown) co-act with each other to provide the vertical pivoting around the horizontal axis A-A and pivoting in horizontal plane around the vertical axis B-B to provide the appropriate motions (as shown on FIG. 2).

Referring to FIGS. 1-7, the user 110 may stand sideways on upper surface of the user board 120, or user platform 146 i.e., with shoulders parallel to horizontal axis A-A (as shown on FIGS. 6B-6E). Alternatively, the user 110 may stand on top of the user platform 120, user platform 146 or the ski module (described in detail in FIGS. 27-30 herein, facing forward, i.e., with shoulders perpendicular to the horizontal axis A-A (as shown on FIG. 6A). The body and feet positions can be varied to propel the platforms and emulate the movements encountered during different types of sporting activities.

FIG. 2 schematically illustrates the range of motions that can be produced by the exercise device 100 of this invention. The horizontal axis of user platform 146 and user board 120 is represented by A-A and the vertical axis is represented by B-B. The lateral tilt or pivot of the user platform 146 and user board 120 around the horizontal axis A-A in the vertical plane and pivot of the user platform 146 and user board 120 in the horizontal plane around the vertical axis B-B are affected by the user's 110 body and foot positions and motions on foot mounts 130. This combination of pivoting in the vertical plane around the horizontal axis A-A and pivoting in the horizontal plane around the vertical axis B-B can simulate "edging" produced by snowboarders, skiers and other motion sport participants. The horizontal axis A-A and vertical axis B-B are referenced throughout the descriptions of the exercise devices described herein, although they are not shown on the subsequent drawings.

Figure 3:
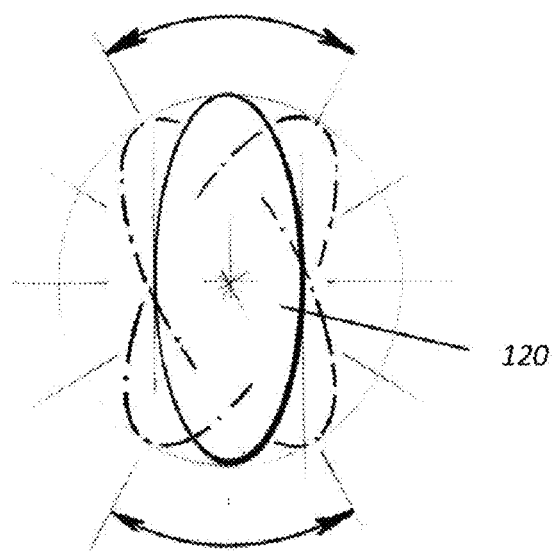
FIG. 3 is a top plan view of the user board 120 shown in FIG. 2 showing the range of pivot movements of the user board 120 in the horizontal plane around the vertical axis B-B shown in FIG. 2. The user platform 146 (not shown) under the user board 120 conforms to or follows the movements of the user board 120.
Figure 4:
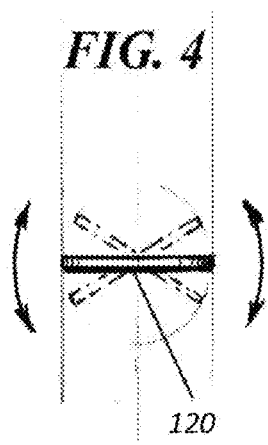
FIG. 4 is an end view of the user board 120 shown in FIG. 2 showing the range of pivot movements of the user board 120 in the vertical plane around the horizontal axis A-A shown in FIG. 2. The user platform 146 (not shown) under the user board 120 conforms to or follows the movements of the user board 120.
Figure 5:
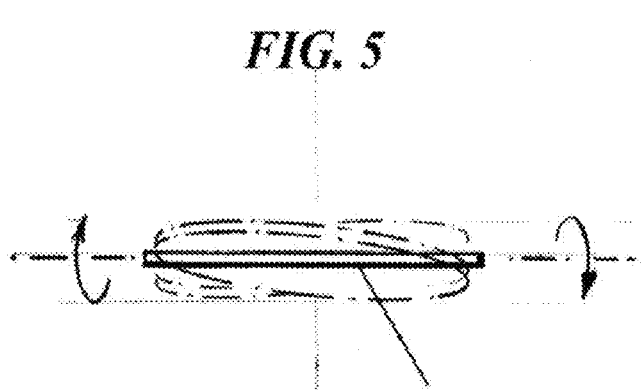
FIG. 5 is a side view of the user board 120 shown in FIG. 2 showing the range of movements of the user board 120 in the vertical plane around the horizontal axis A-A shown in FIG. 2. The user platform 146 (not shown) under the user board 120 conforms to or follows the movements of the user board 120.
Figure 6A:
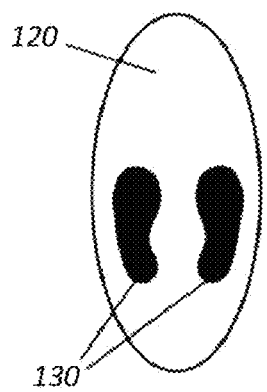
FIGS. 6A through 6E are schematic top views of the user board 120 depicting a variety of possible foot placement positions 130 on the user board 120 that drive the vertical and horizontal pivot motions of the user board 120 and user platform 146. Foot mounts (not shown) can be mounted directly on the user board 120 or on the user platform 146 if the user board 120 is not used.
Figure 6B:
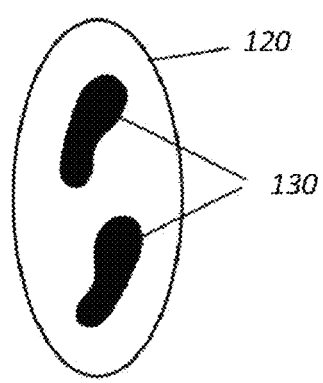
Figure 6C:
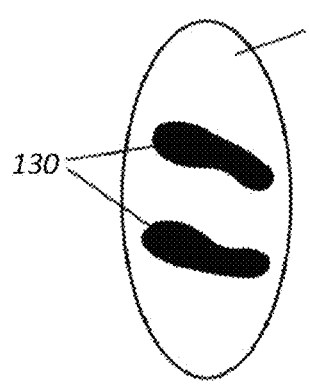
Figure 6D:
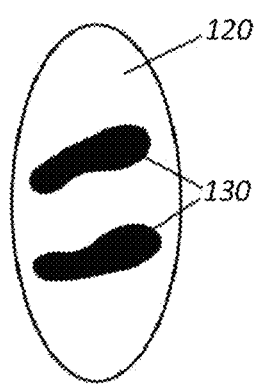
Figure 6E:
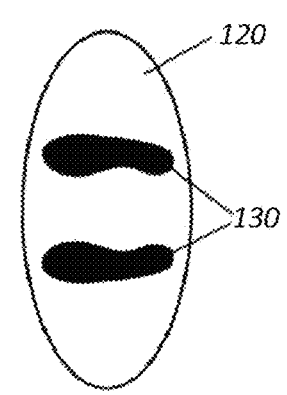

FIGS. 3 through 5 are schematic views showing the various movements possible by the user platform 146 and user board 120 of the exercise device of this invention. FIG. 3 is a top plane view of the user platform 146 and user board 120 showing the range of movements of the user platform 146 and user board 120 in the horizontal plane around the vertical axis B-B. FIG. 4 is an end view of the user platform 146 and user board 120 showing the range of lateral tilt or pivot movements of the user platform 146 and user board 120 in the vertical plane around the horizontal axis A-A. FIG. 5 is a side view of the user platform 146 and user board 120 shown in FIG. 2 demonstrating the range of lateral tilt or pivot movements of the user platform 146 and user board 120 in the vertical plane around the horizontal axis A-A.

FIGS. 6A through 6E show a variety of the infinite foot positions on foot mounts 130 mounted on user platform 146 or user board 120. The overall concept of the present invention provides a means for user 110 to select foot positions on the user platform 146 and user board 120 in a number of ways to emulate various sports activities or to utilize the device for training purposes, teaching, rehabilitation, entertainment or competition.

Figure 7:
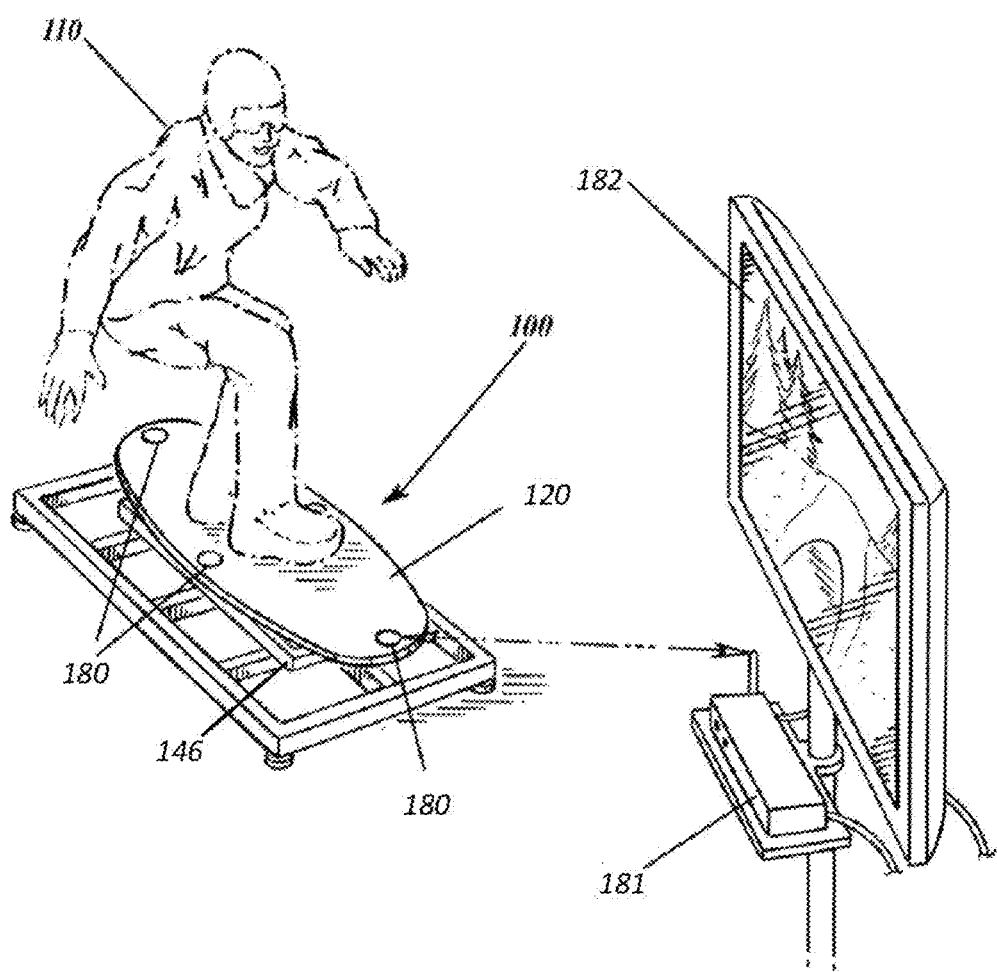
FIG. 7 is a perspective view showing an embodiment of the exercise device 100 of this invention wherein the exercise device 100 communicates through sensors 180 integrated into the device 100 (e.g., the user board, user platform or both) to transmit (wired or wireless) the motion, velocity, acceleration of motion and/or position of the user board 120 and/or the user platform 146 to a CPU (Computer Processing Unit), game console, tablet, Virtual Reality glasses, computer 181 and/or video monitor 182 to allow for an interactive experience that may include data compilation on the exercise motions.

Referring to FIG. 7, the exercise device of this invention 100 may be linked to a video monitor 182 through a wireless or wired connection. User 110 is positioned on the user platform 146 and user board 120. The movements of a user, the user platform 146 and/or of user board 120 are tracked by motion sensors, potentiometers, accelerometers, strain gauges or other electronic instruments 180 positioned on or under the user platform 146 and user board 120, on or inside the support post (not shown), on foot mounts 130 and on any other part of the exercise device 100 and/or on the user 110 (not shown). Sensors 180 extrapolate the user's movements and relay them to a central processing unit (CPU), game console, tablet, Virtual Reality glasses, computer 181 and/or viewing monitor 182. The means for connectivity are numerous and can be, for example, Bluetooth®, Wi-Fi, and hard wired. The user 110 can also engage in online gaming in order to compete with other users, e.g., ski races, slalom races, etc. More detailed descriptions of the gaming capabilities are discussed below.

The exercise device 100 and sensors 180 can be coupled with a computer program, application ("App"), etc. to monitor activity and physical condition, e.g., calories, heartbeat, miles, time, etc. Other benefits could be realized in the form of detailed rehabilitation charts showing the physical progress of a user that is coming back from an injury.

As discussed in more detail herein, a plurality of adjustable resistance elements are mounted to the support post to control the level of resistance, velocity and angle of pivot of the user platform 146 and user board 120 in the horizontal plane around the vertical axis B-B. The exercise device may also include a plurality of adjustable resistance elements mounted to the user platform 146 and user board 120 to control the level of resistance, velocity and angle of pivot of the user platform 146 and user board 120 in the vertical plane around the horizontal axis A-A. Such adjustable resistance elements mounted to the user platform 146 or the user board 120 may include a guiding tilt mechanism that guides and controls the tilt of the user platform 146 and user board 120. The guiding tilt mechanism can be in the form of a linkage system or guiding rails, tracks or ramps to, for example, emulate skiing or snowboarding exercise motions. FIGS. 8-16

FIGS. 8 through 16 depict an embodiment of the exercise device 200 of this invention without the guiding tilt mechanism that controls the tilt of the user platform 246 (as shown in other embodiments herein). Instead of such guiding tilt mechanism the exercise device 200 employs vertical resistance springs 221 (as described below) to control the level of resistance, velocity and angle of pivot of the user platform in the vertical plane around the horizontal axis A-A. The principle movements are the same as described above with respect to the exercise device 100.

Figure 8:
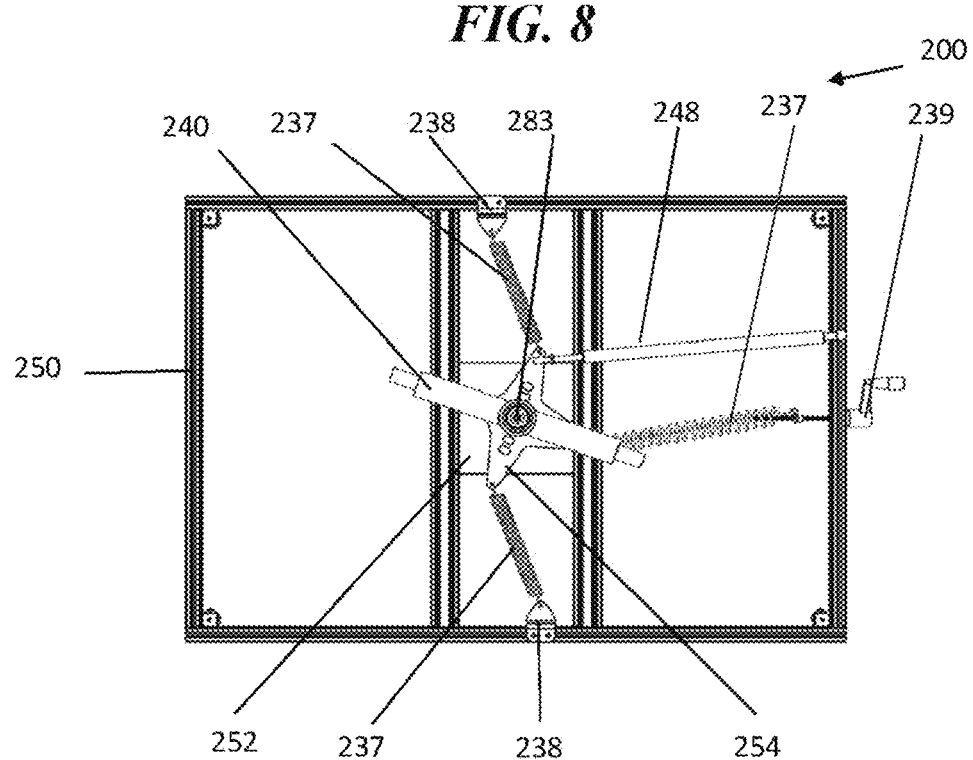
FIGS. 8 through 16 illustrate an embodiment of the exercise device 200 of this invention that incorporates the use of the dampening piston strut 248 and a plurality of vertical resistance springs 221 and horizontal resistance springs 237 (or other types of resistance elements as further described herein) to enable control of resistance around the horizontal and vertical pivots of the user platform 246 about the support post 240 that supports and mounts the user platform 246 to the base 250.

FIG. 8 is a top view of the exercise device 200 without the required user platform 246, vertical pivots 244 or vertical bars 245 depicted on the subsequent drawings (for example in FIGS. 10-15). The exercise device 200 includes a base 250 with a horizontal support mount 252 to accommodate various mounting means for the support post 240. Support post 240 consists of a vertical column with the horizontal cross bar section mounted on top of it. The support post 240 is used for purposes of mounting the user platform 246 on top of the cross bar section of that support post (as shown e.g. on FIGS. 10-15). A plurality of adjustable resistance elements 237 is mounted to the support post 240 to control the level of resistance, velocity and angle of pivot of the user platform 246 in the horizontal plane around the vertical axis B-B. Each horizontal resistance spring 237 is attached at one end to mounting arms 254 that coact with the support post 240. The other end of the horizontal resistance springs 237 is mounted to the base 250 by way of mounting members 238. In the embodiment depicted in FIGS. 8-16, there are three resistance elements 237. Preferably, at least one of the resistance elements 237 is adjustable to further control the level or resistance, velocity and angle of pivot of the user platform 246 in the horizontal plane around the vertical axis B-B. In the embodiment depicted, a dampening piston strut 248 is also attached on one side to the mounting arms 254 and on the other side to the base 250. Both the dampening piston strut 248 and horizontal resistance springs 237 create resistance and control in the rotation of the support post 240 to control the horizontal pivoting of the user platform 246 around the vertical axis B-B. As discussed above, the resistance elements 237 may adjustable to further control the velocity and angle of pivot of the user platform 246 in the horizontal plane around the vertical axis B-B. The degree of resistance of the horizontal resistance springs 237 can be adjusted by extending or contracting the length of the springs by various means, including by the spring adjuster 239. Optionally, the dampening element 248 is also adjustable to further control the level or resistance, velocity and angle of pivot of the user platform 246 in the horizontal plane around the vertical axis B-B.

Other types of resistance mechanisms (not shown) can also be used create resistance for horizontal rotation of the user platform 246 around the vertical axis B-B. These mechanisms may include spring resistance mechanisms, rotary or linear dampers of various types (including magnetic, magnetic fluid, hydraulic, gas or spring), rubber band resistance, alternators, flywheel with various types of resistance (including magnetic, hydraulic, felt pad or other pads).

These resistance mechanisms can be connected between the base 250 or horizontal support mount 252 and the mounting arms 254 that are pivoting together with the support post 240 and user platform 246. The mounting arms 254 are attached to the support post 240. These mounting arms can be of various shapes and may include holes or slits.

Optionally, mounting arms 254 and/or the base 250 may be used to attach various other components to the exercise device, such as handle bars, a harness to assist the user with balancing on the device, amortization shock absorbers or rotation stoppers to soften or limit horizontal rotation of the user platform 246 at extreme points.

Figure 9:
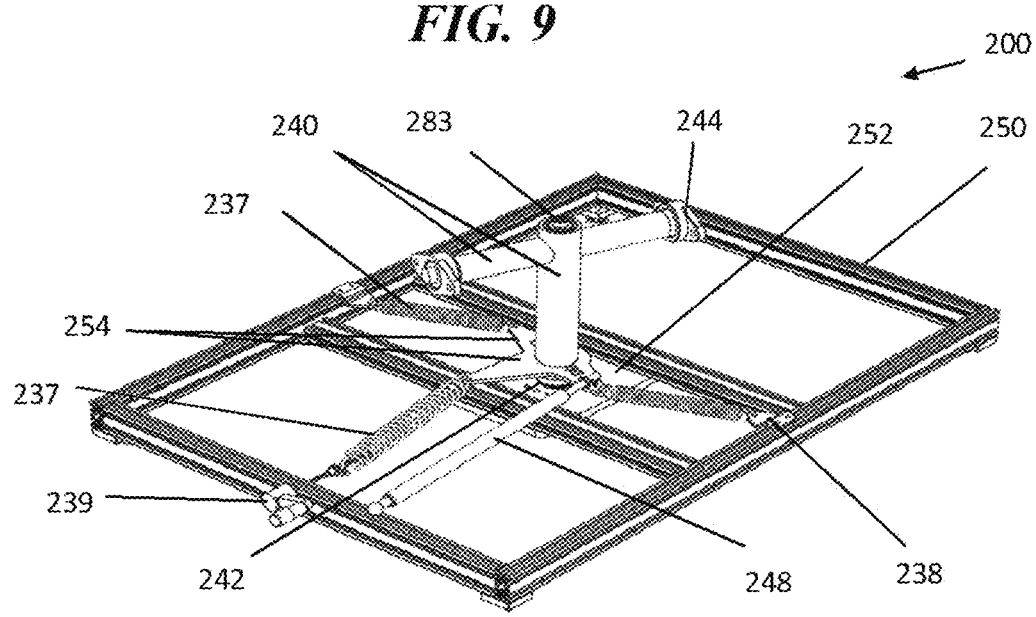
Figure 16:
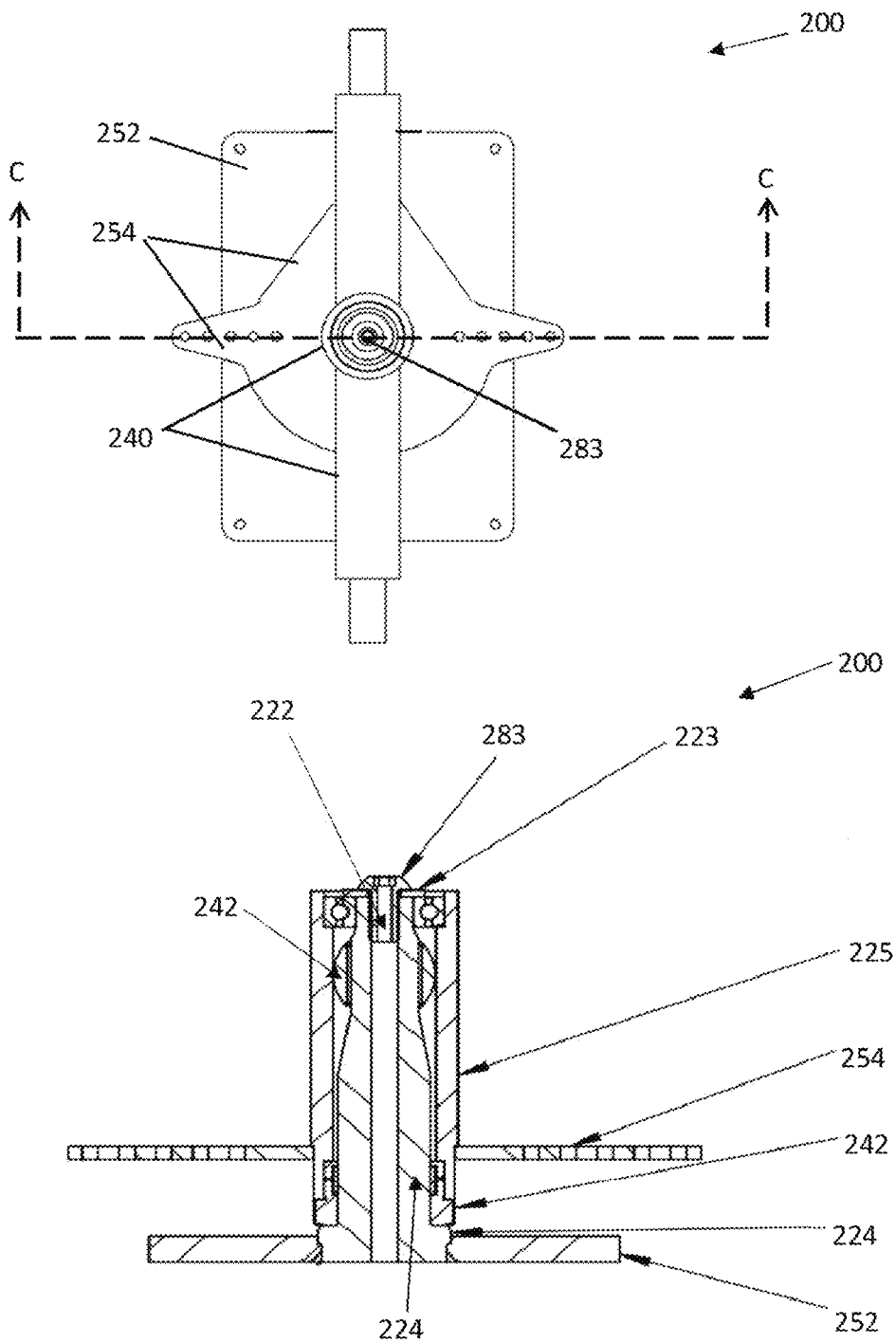

FIG. 9 is a perspective view from the top lateral side of the exercise device showing vertical pivots 244 that are connected to the cross bar section of the support post 240. FIG. 9 shows the support post 240 mounted to the top of the central horizontal pivot 242 to permit rotation or pivoting in the horizontal plane around the vertical axis B-B as described above. Another central horizontal pivot 242 is installed around the main shaft 224 inside the support post 240 (as seen in FIG. 16).

Figure 10:
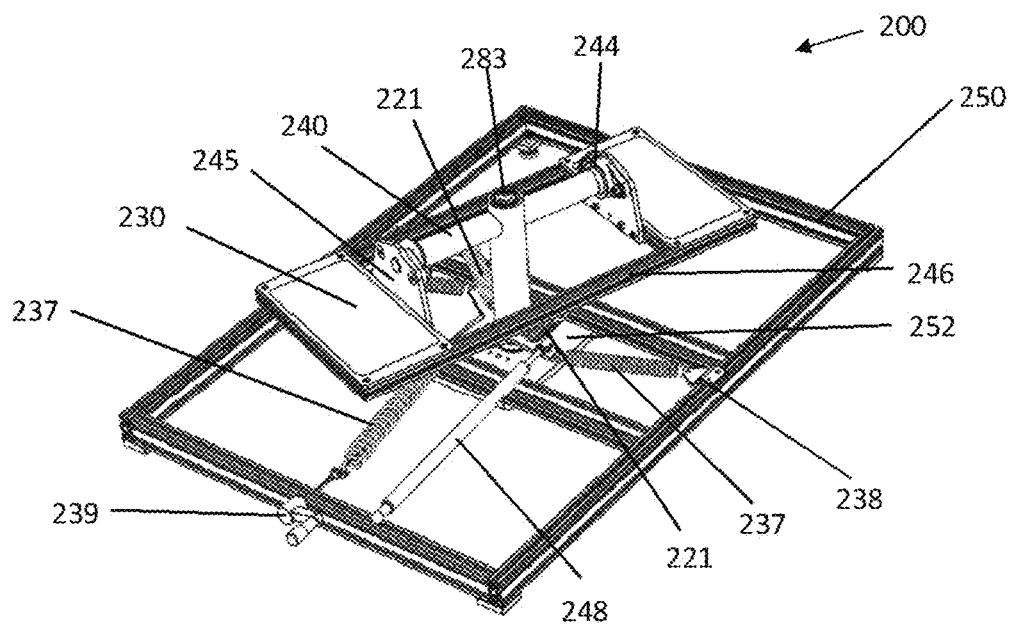

FIG. 10 is a perspective view from the top lateral side of the exercise device with the user platform 246 installed. The user platform 246 is mounted to the vertical plates 245. Vertical plates 245 are attached to vertical pivots 244 at both ends of the cross bar of the support post 240. Vertical pivots 244 allow for the lateral tilt or pivot of the user platform 246 around the horizontal axis A-A as described previously.

As described in detail above, the horizontal resistance springs 237, dampening piston strut 248 or other dampening means create resistance for horizontal rotation or pivot of the user platform 246 around the vertical axis B-B. Referring to FIGS. 10-15, in addition to horizontal rotation resistance, the embodiment 200 includes vertical resistance springs 221 that create vertical resistance for lateral tilt or pivot of the user platform 246 around the horizontal axis A-A. One end of each vertical resistance spring 221 is attached to mounting arms 254 and the other end of each vertical resistance spring 221 is attached to the user platform 246.

FIGS. 10-15 show that the top end of the vertical resistance springs 221 is attached to the sides of the user platform 246. However, the top of such springs can be attached at any other point on or under the user platform 246 and the bottom can be attached on the any rotating part of the device between the mounting arms 254. For example, one end of the springs can be attached to the middle of the user platform 246 directly under the foot mounts 230 and the other end of the springs attached anywhere between the mounting arms 254. Other types of resistance mechanisms (not shown) can also be used create resistance for lateral tilt or pivot of the user platform 246 around the horizontal A-A axis. They could include dampening piston struts, spring resistance mechanisms, rotary or linear dampers of various types (including magnetic, magnetic fluid hydraulic, gas or spring), rubber band resistance, hydraulic resistance, electric motor or alternator resistance or other type of resistance mechanisms (not shown). Such resistance mechanisms can be attached between (1) vertical plates 245 or user platform 246 and (2) mounting arms 254, support post 240, base 250, and horizontal support mount 252 or other parts of the device.

Figure 11:
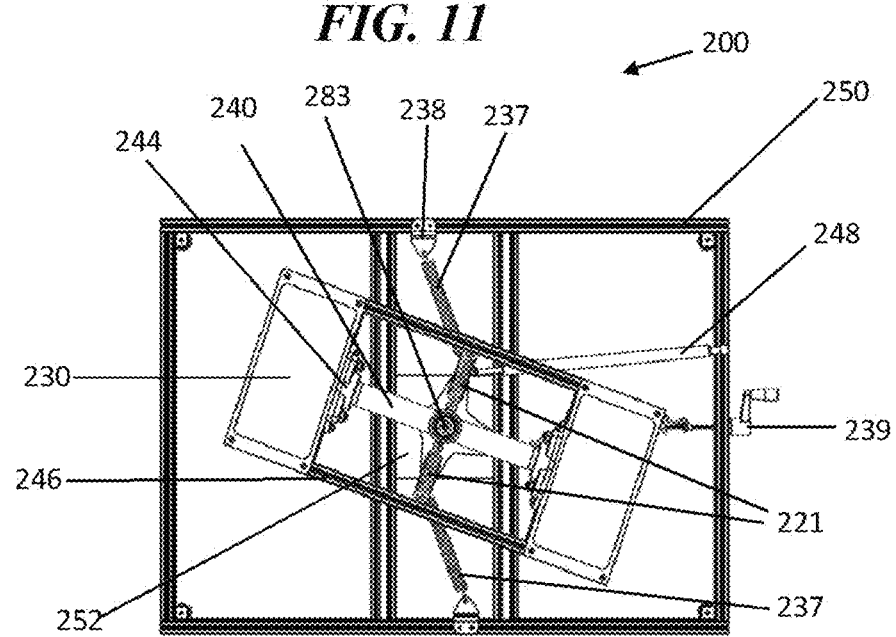
Figure 12:
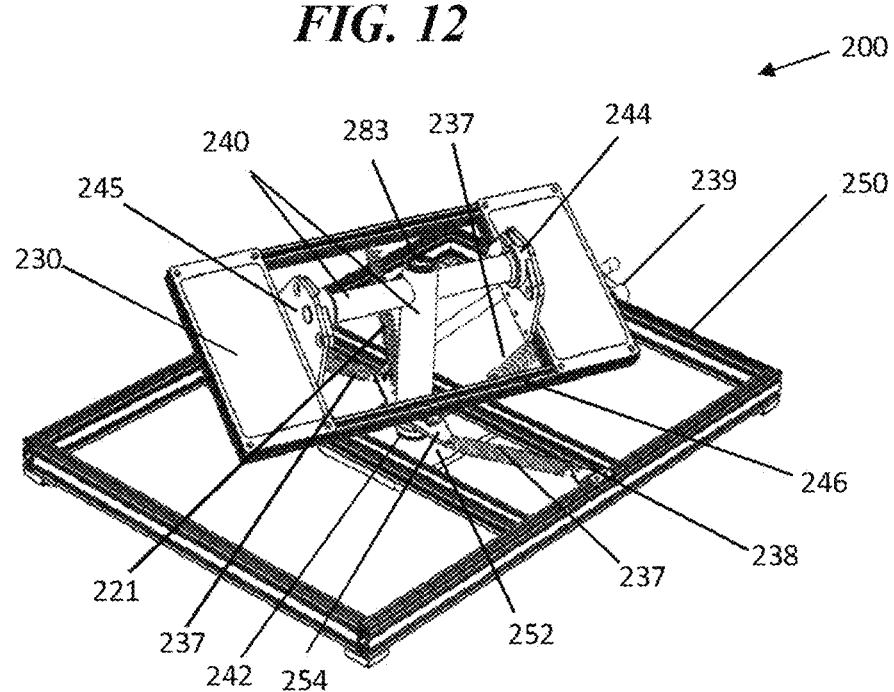
Figure 13:
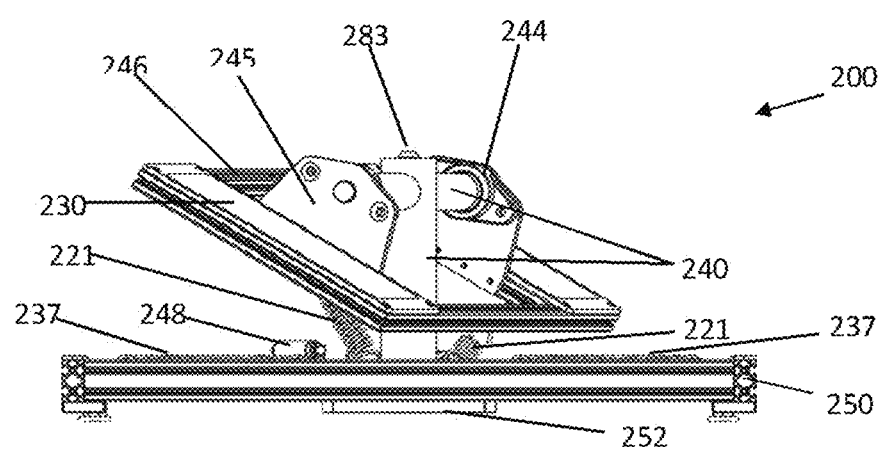

FIG. 11 is a top view of the exercise device 200. FIGS. 12-13 are perspective views from the top lateral side of the exercise device showing the movement of the user platform 246 side to side. The exercise device 200 creates "carving" simulation through the combination of lateral tilt or pivot (to simulate pronation and supination "edging" movement in skiing or hill to toe movement in snowboarding) and horizontal rotation movement. It uses a synergistic balance of resistance elements described herein and pivot points between the base, the support post and user platform to create a smooth, realistic simulation of the real world movements in motion sport activities.

Figure 14:
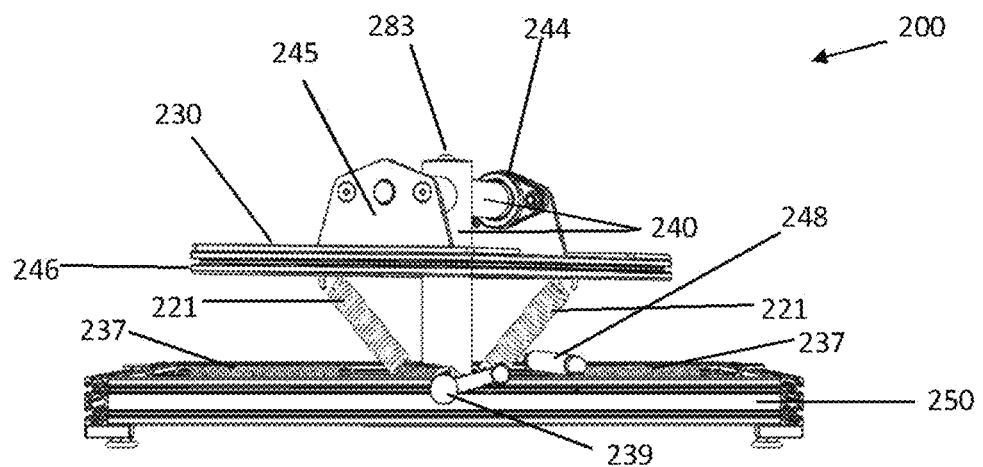
Figure 15:
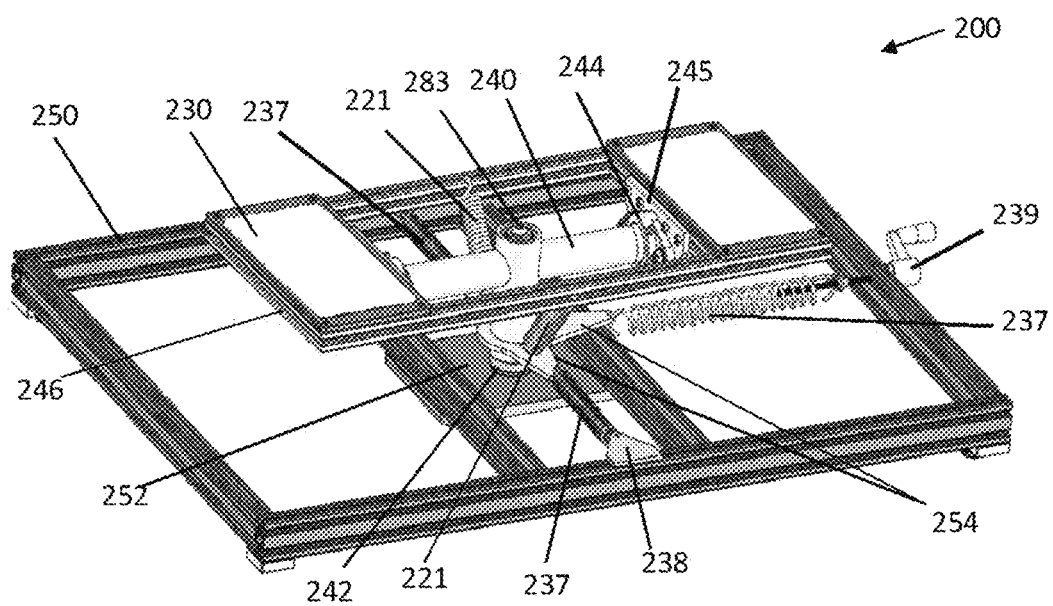

FIG. 14 is a side view of the exercise device 200 showing the vertical resistance springs 221 that create vertical resistance for lateral tilt or pivot of the user platform 246 around the horizontal A-A axis. This lateral movement resistance adds extra complexity and, coupled with the rotational motion resistance, is appropriate for more experienced athletes who would like to maintain and improve their balance, increase strength and endurance required for motion sports. Another feature of the exercise device 200 is that the user platform 246 can be moved up and down the vertical plates 245 to create more or less stability of the user platform 246 around the horizontal A-A axis. A user can move the user platform 246 up the vertical bars 245 to reduce stability and make the exercise more challenging, or down to increase stability. FIG. 15 is another side view of the exercise device 200 with the user platform 246 moved up to the top of the vertical bars 245.

FIG. 16 is a cross sectional view of the vertical column section of the support post 240. The support post 240 consists of a vertical column 225 that is mounted on top of the main shaft 224 and held by hex drive screw 222 that is thread through washer 223. Central horizontal pivots 242 are located at the bottom of the vertical column 225 and inside of the vertical column 225 around the main shaft 224 to create rotation in the horizontal plane around the vertical axis B-B as described above. Alternatively, central horizontal pivot can be included between the cross bar and vertical column sections of the support post 240. The main shaft 224 is mounted on top of the horizontal support mount 252. A potentiometer may be mounted on top of the support post 240.

FIGS. 17-38

FIGS. 17 through 38 illustrate other embodiments 300 of the exercise device of this invention, which includes the same components as depicted in FIGS. 8-16 (exercise device 200), with the exception that the vertical resistance springs 221 are not included. In these embodiments 300, the lateral tilt or pivot of the user platform 346 around the horizontal A-A axis is controlled by a guiding tilt mechanism. This guiding tilt mechanism provides more stability for the user platform 346 and therefore facilitates the usage of the exercise device with a ski module that can be attached to the user platform 346 (as further described in FIGS. 27-30 below). The guiding tilt mechanism can be in the form of a linkage system or guiding rails, tracks or ramps system. Both systems are further described below.

FIGS. 17 through 30 show the embodiment of the exercise device of this invention 300 that utilizes the same elements from the previous embodiment 200 in order to affect horizontal pivot/rotation, lateral tilt/pivot and dampening means. However, the vertical resistance springs 221 are not used. In their place the exercise device 300 incorporates a guiding tilt mechanism in the form of a linkage system to create a smooth yet stable and guided lateral tilt or pivot movements of the user platform 346 around the horizontal A-A axis.

Figure 17:
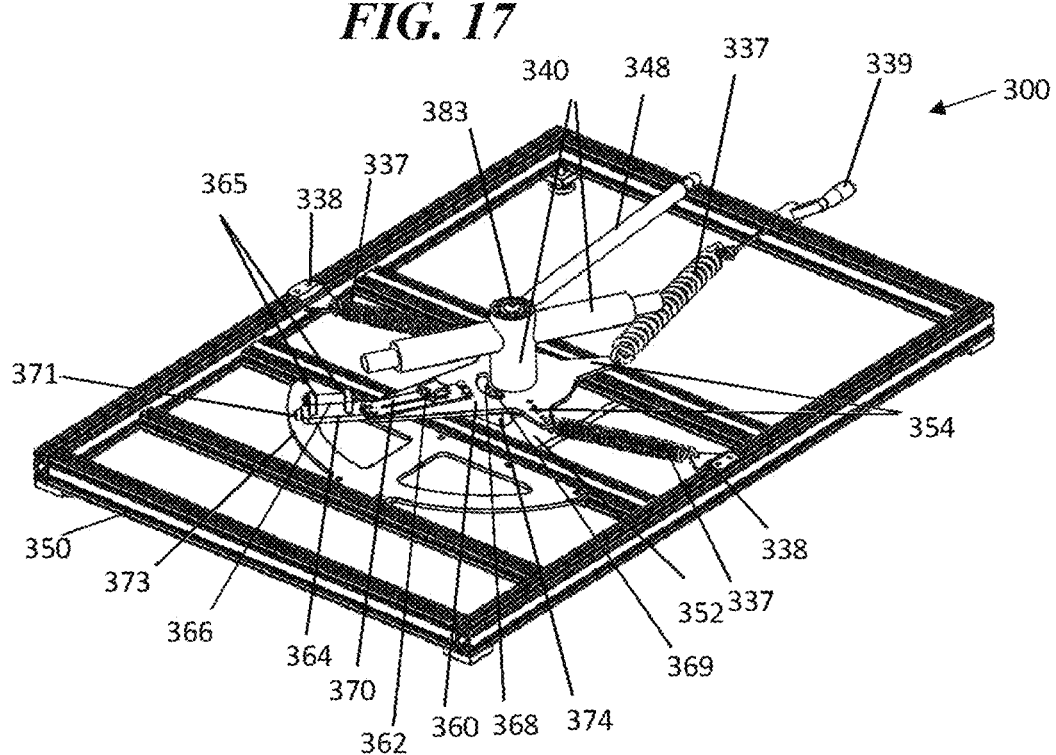
Figure 18:
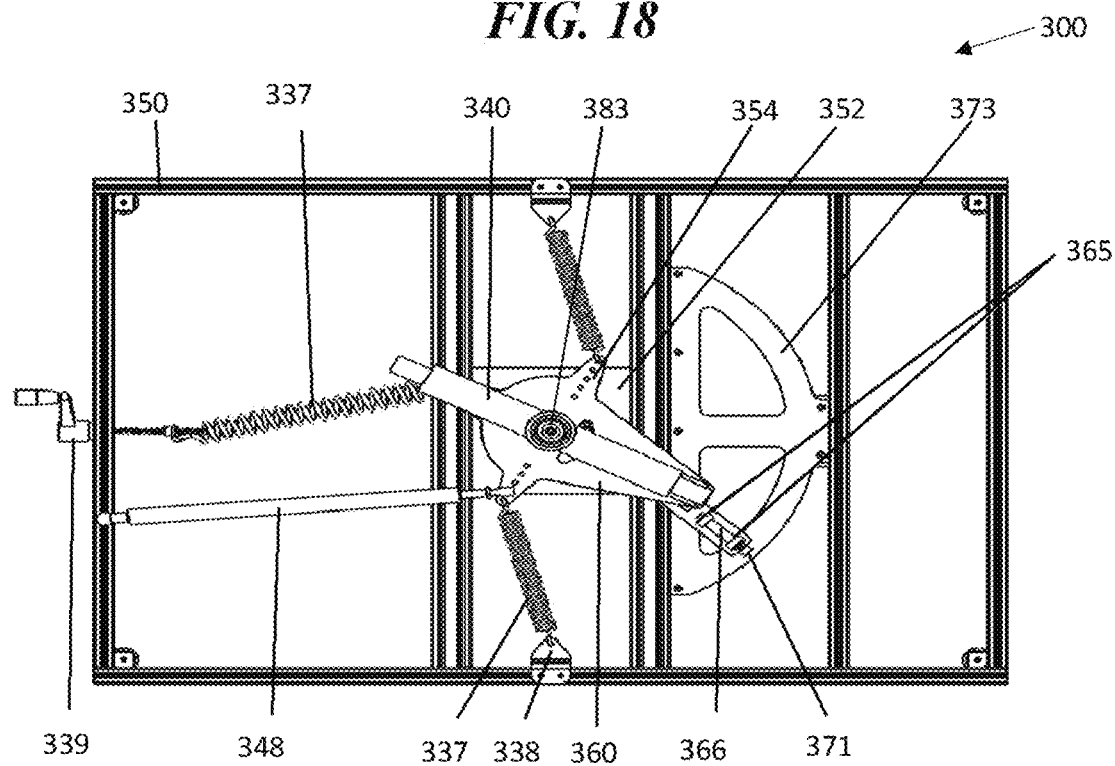

FIG. 17 is a perspective view from the top lateral side of the exercise device 300 with the vertical pivots 344 and the user platform 346 omitted. FIG. 17 shows the same elements as shown in FIG. 9. However, in addition, it includes the linkage system components that are described in detail in FIGS. 20-26. FIG. 18 is a top view of the device embodiment 300 before installing the vertical pivots 344 and the user platform 346.

Figure 19:
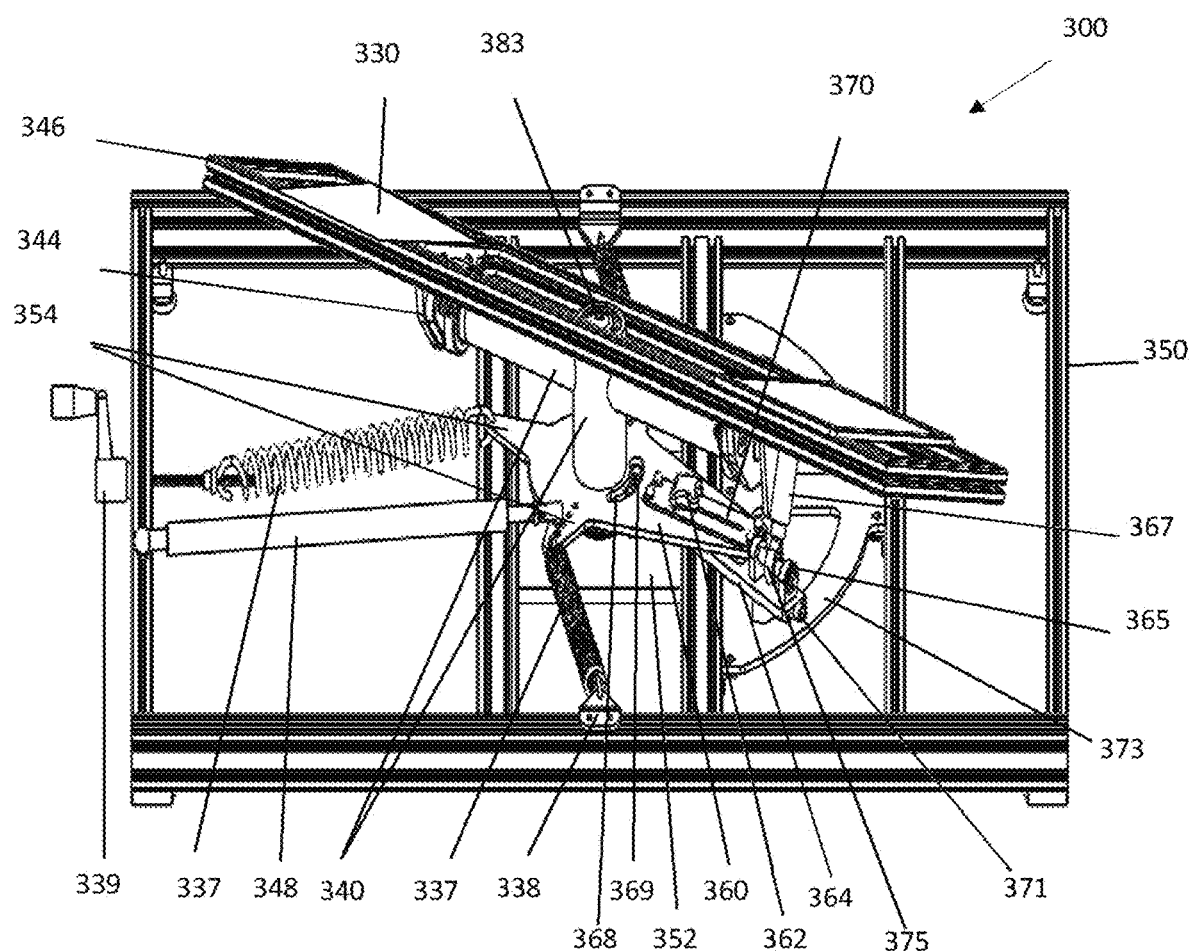

FIG. 19 is a perspective view from the top lateral side of the exercise device 300 with the vertical pivots 344 and the user platform 346 installed. This figure shows the movement of the user platform side to side that creates "carving" simulation through the combination of lateral tilt or pivot and horizontal rotation movement. The exercise device 300 further includes an adjustable guiding linkage plate mechanism that guides and controls the tilt of the user platform 346 in the vertical plane. The linkage system is presented in more detail in FIGS. 20-26 and consists of the following elements:

(a) top plate 360 that has mounting arms 354. The top plate 360 includes a straight slit 370 along the middle of the elongated section of that plate. It also includes a semicircular slit 368 between the mounting arms 354. Top plate 360 is permanently affixed to support post 340 and rotates together and in sync with it.

Figure 20A:
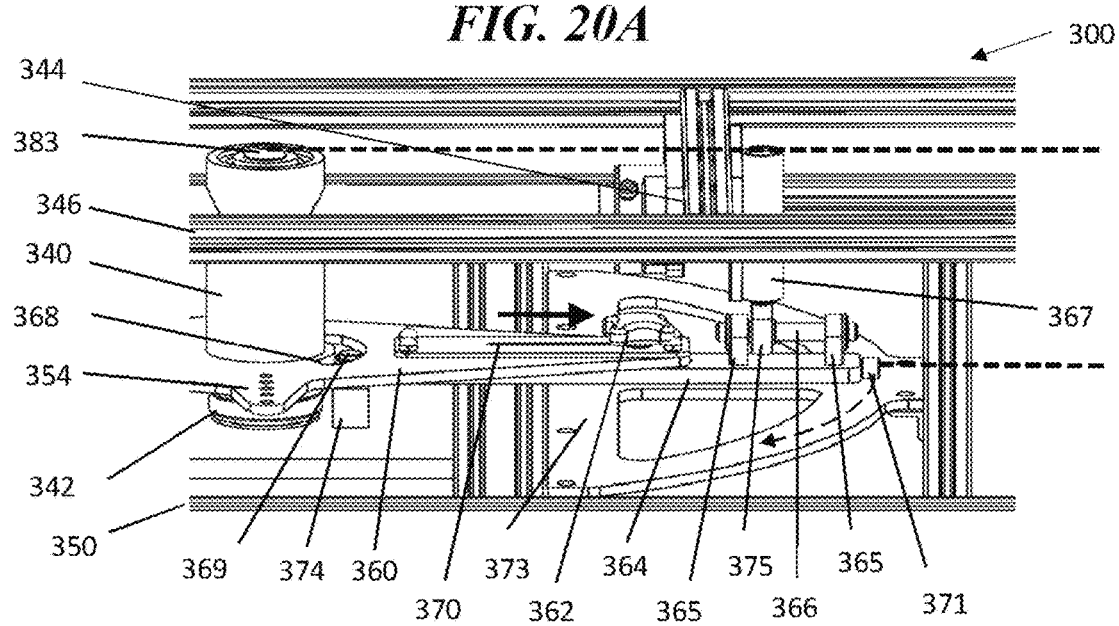
Figure 20B:
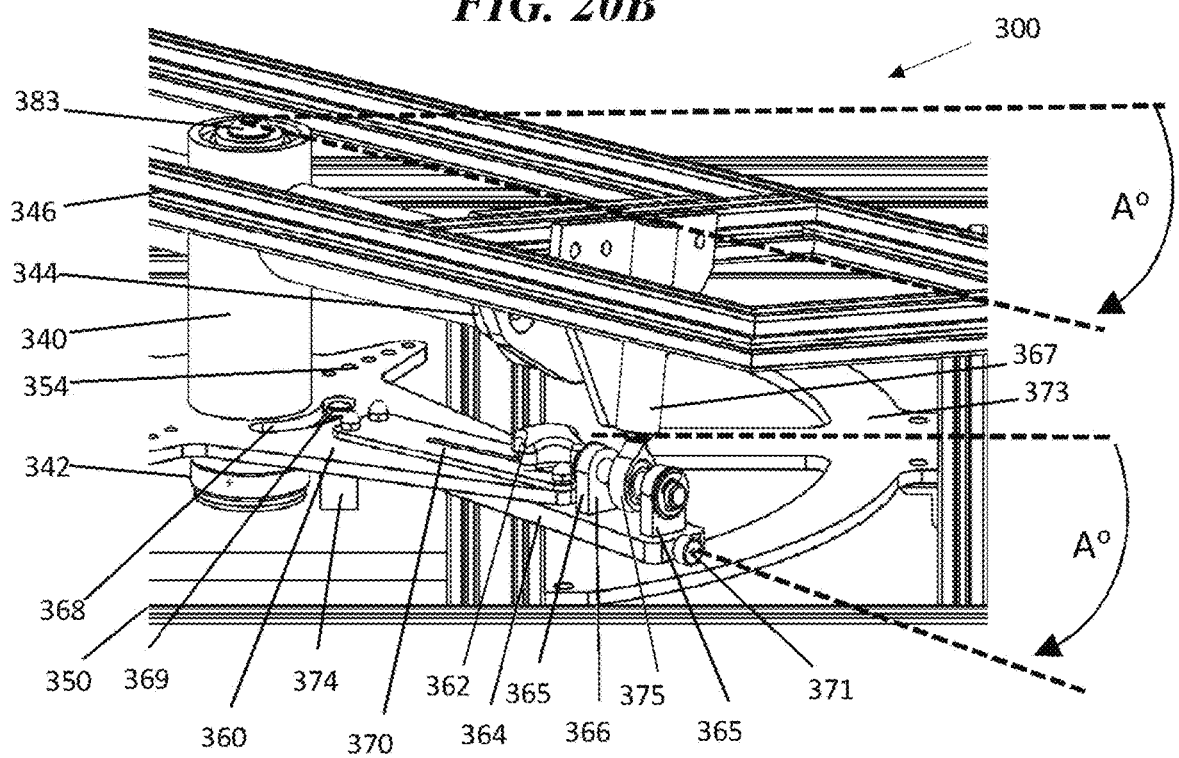
Figure 21A:
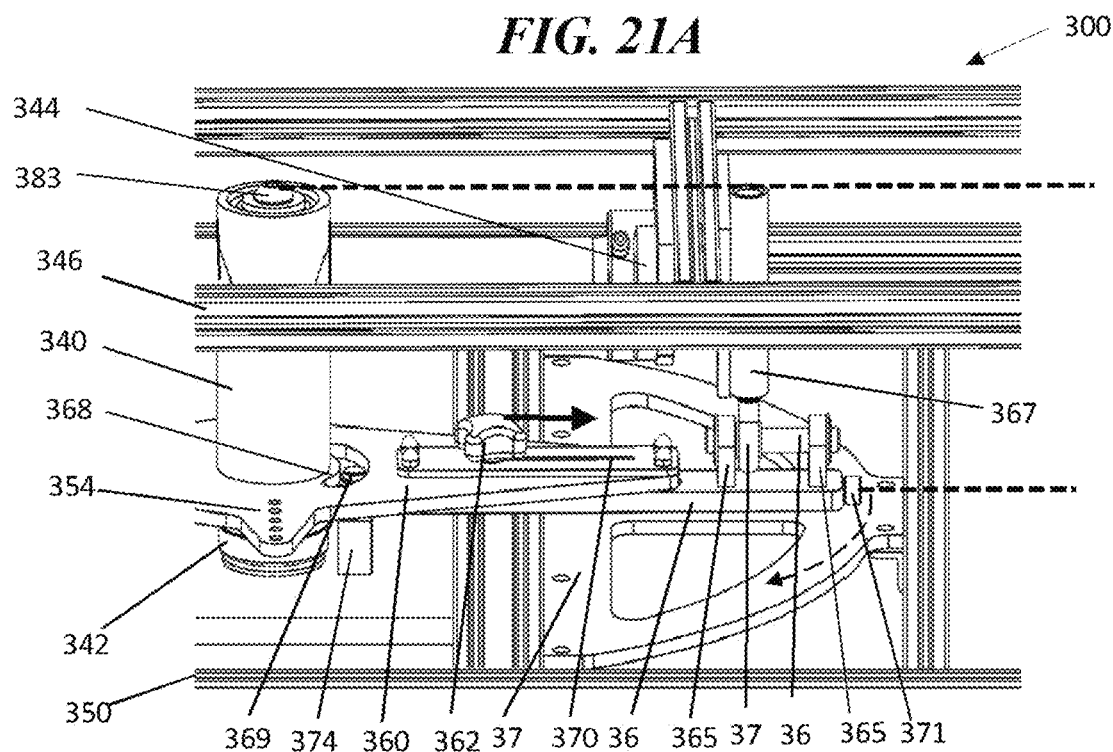
Figure 21B:
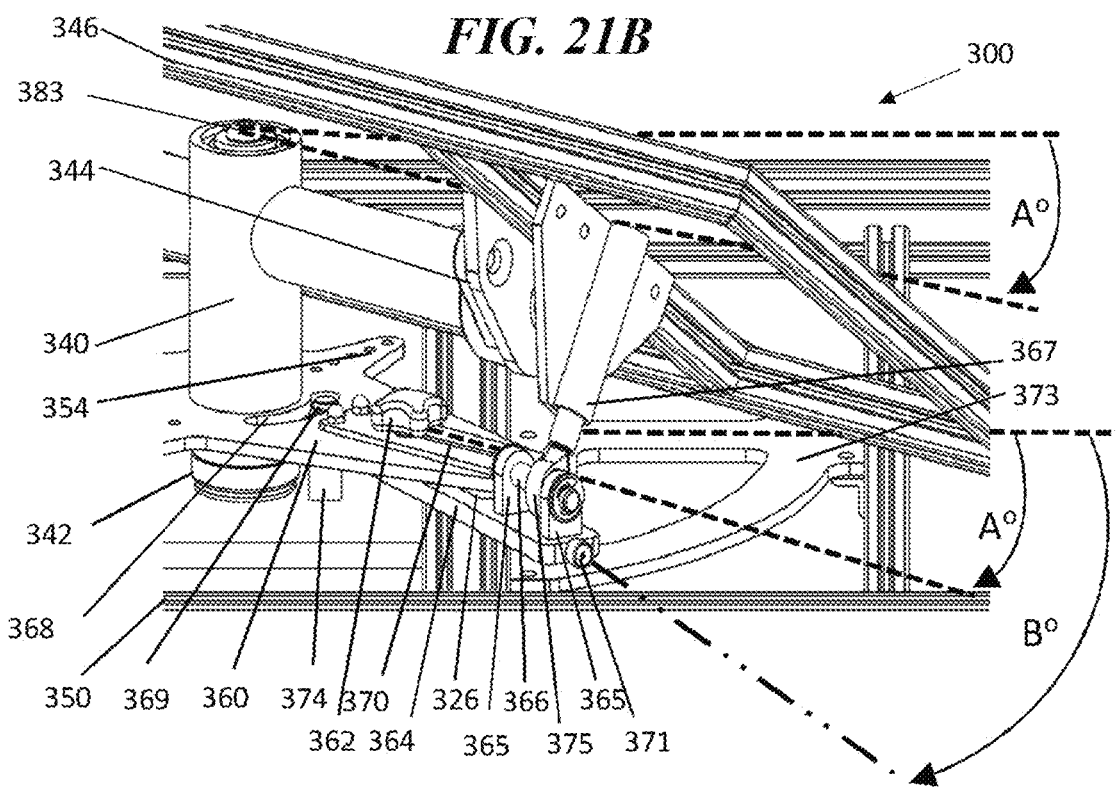
Figure 22:
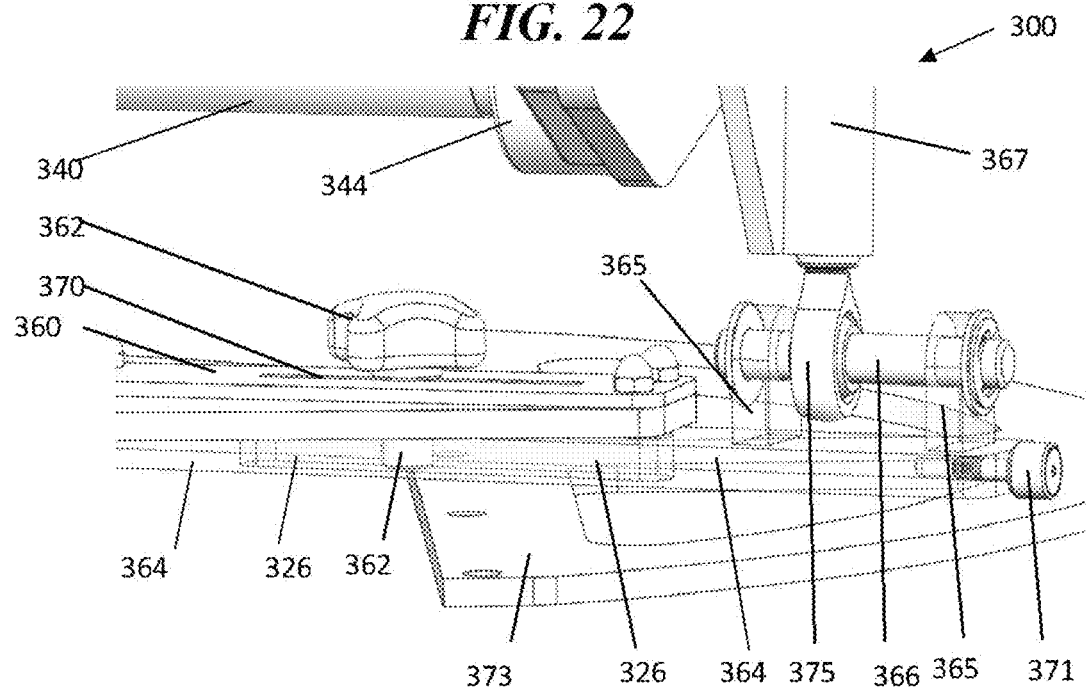

(b) bottom plate 364 with a straight slit 326 along the length of and in the middle of that plate (as seen on FIG. 22, 26 and partially on FIG. 21B). One end of the bottom plate 364 is supported by the supporting base 374 (as seen in detail on FIGS. 20-21, 24 and 26). The bottom plate 364 is attached to and rotating around the pivot post 369 that is inserted into the supporting base 374 and protruding through the semicircular slit 368 (as seen in detail on FIGS. 24, 26 and partially on FIGS. 20-21). The other end of the bottom plate 364 is attached to the supporting roller 371 and rolls on top of the horizontal roller plate 373 in semi-circular motion. The supporting roller 371 supports the bottom plate 364 when it rotates around the pivot post 369.

(c) knob and roller pin 362. The roller pin is attached to the bottom of the knob (as seen in more detail on FIG. 22). That roller pin is thread through slit 370 along the middle of the elongated section of top plate 360 and also through slit 326 along the middle of the bottom plate 364. The knob and roller pin 362 can be moved along the slits 370 and 326 and the roller pin's position can be fixed anywhere along the slits by tightening the knob.

(d) two posts 365 attached at the end of the bottom plate 364 with a connecting horizontal bar 366 between the posts;

(f) vertical bar and/or telescopic tube 367 that has the loop with bearing 375 at the bottom of it. The top end of the vertical bar and/or telescopic tube 367 is connected to the user platform 346. Both the user platform 346 and top plate 360 are attached to the support post 340. Therefore, as the support post 340 and user platform 346 rotate, the top end of the vertical bar and/or telescopic tube 367 moves in sync with the top plate 360. The bottom end of the vertical bar and/or telescopic tube 367 is connected to the bottom plate 364 by the loop with bearing 375 that is threaded through the horizontal bar 366. Therefore, the bottom end of the vertical bar and/or telescopic tube 367 moves in synch with the bottom plate 364. If the bottom plate 364 and top plate 360 rotate by the same amount, then the top end and bottom end of the vertical bar and/or telescopic tube 367 also move by the same amount. Therefore, the vertical bar and/or telescopic tube 367 stays in vertical position and user platform 346 does not tilt or pivot. If the bottom plate 364 moves by more than the top plate 360, then the bottom end of the vertical bar and/or telescopic tube 367 also moves more than the top end. Therefore, the vertical bar and/or telescopic tube 367 tilts and causes user platform 346 to tilt or pivot.

The degree of rotation of the bottom plate 364 relative to the top plate 360 is determined by the position of the knob and roller pin 362 within the slits 370 and 326. FIGS. 20A and 20B demonstrate what happens when the knob and roller pin 362 is moved along the slits closer to the vertical bar and/or telescopic tube 367. In such case, when the user pushes on the user platform 346 and therefore rotates the top plate 364, the knob and roller pin 362 pushes on the bottom plate 360 at a point which further away from its point of rotation around the pivot post 369. This causes the top plate 360 and bottom plate 364 to rotate in sync and by the same amount of AO degrees (FIG. 20B). Therefore, the top end and bottom end of the vertical bar and/or telescopic tube 367 also move by the same amount. Hence, the vertical bar and/or telescopic tube 367 stays in vertical position and user platform 346 does not tilt or pivot around the horizontal axis A-A.

FIGS. 21A and 21B demonstrate what happens when the pin and knob 362 is moved along the slits closer to the pivot post 369. In such case, when the user pushes on the user platform 346 and therefore rotates the top plate 364, the knob and roller pin 362 pushes on the bottom plate 360 at a point which is closer to its point of rotation around the pivot post 369. This allows the top plate 364 and bottom plate 360 to separate and turn by unequal amount of degrees as they compete rotation. The top plate 364 rotates by A° degrees but the bottom plate 360 rotates by the much larger amount of B° degrees (FIG. 21B). This means that the bottom end of the vertical bar and/or telescopic tube 367 also moves by B° degrees and the top end moves by the lesser amount of A° degrees. Therefore, the vertical bar and/or telescopic tube 367 tilts and causes user platform 346 to tilt or pivot around the horizontal axis A-A.

FIG. 22 is showing the knob and roller pin 362 inside both slits 370 and 326 along the middle of the top plate 360 and bottom plate 364 respectively. It also shows a closer view of various other elements of the linkage system, including the vertical bar and/or telescopic tube 367, the loop with bearing 375, the posts 365 with a connecting horizontal bar 366 that is thread through the loop with bearing 375.

Figure 23:
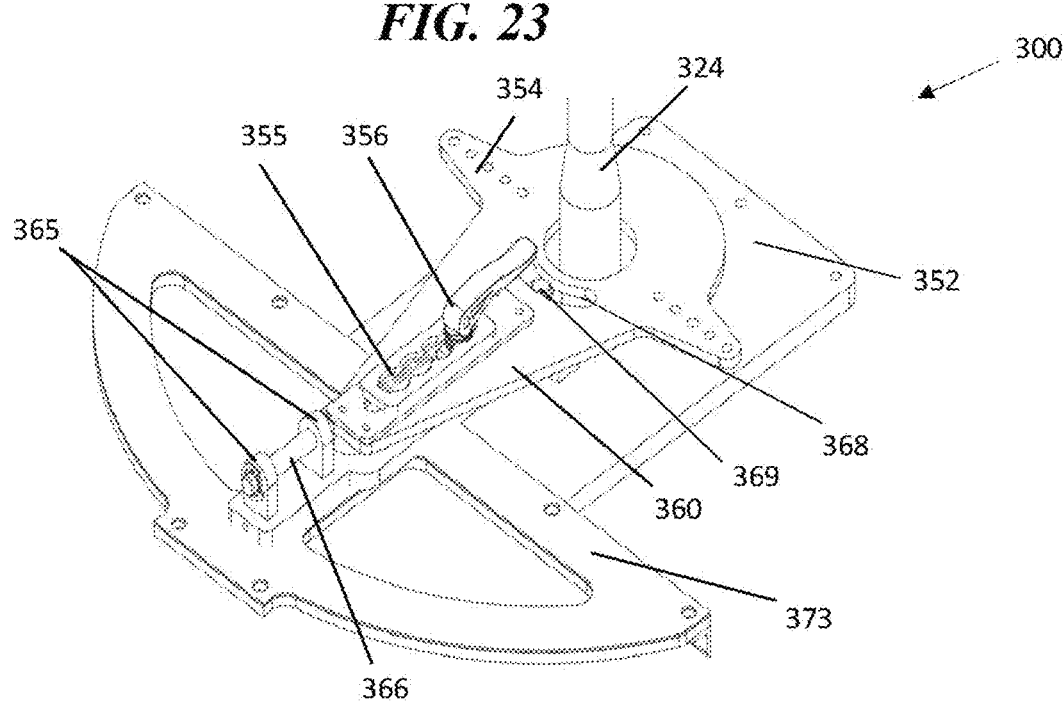
Figure 24:
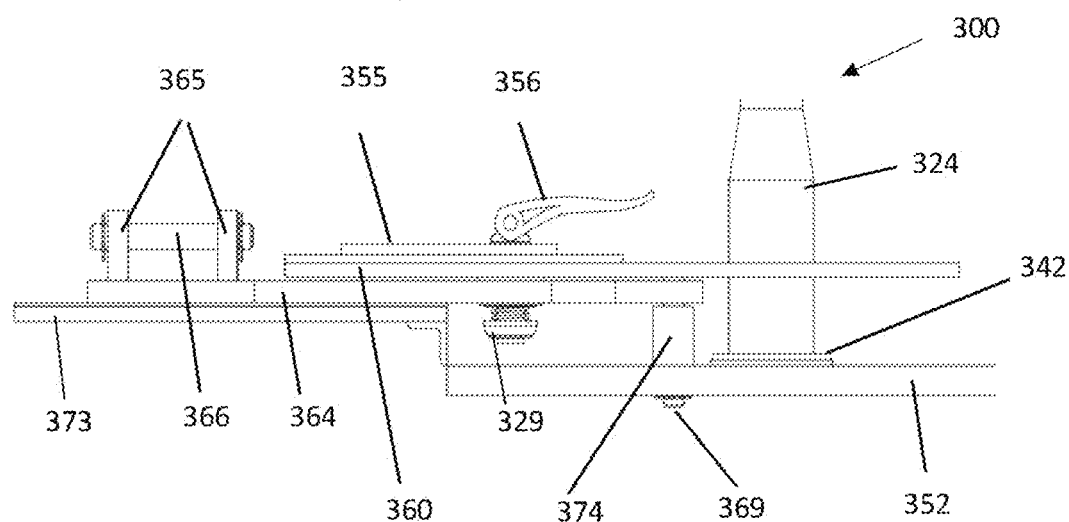

FIGS. 23-26 show a variation of the linkage system described above that replaces the knob and roller pin 362 with quick release skewer lock 356. FIG. 23 is a perspective view from the top lateral side of that variation. It includes the metered board 355 mounted on top of the top plate 360. The metered board 355 has recessed cone-shaped holes designed for housing the quick release skewer lock 356. These holes prevent movement along the slits 370 and 326 when the quick release skewer lock 356 is locked in. FIG. 24 is a view from the side of the linkage system with the metered board 355 and quick release skewer lock 356.

Figure 25:
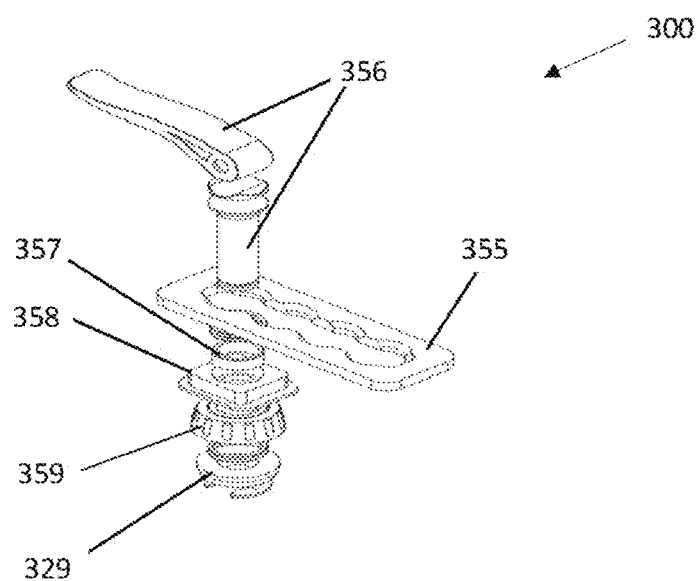
Figure 27:
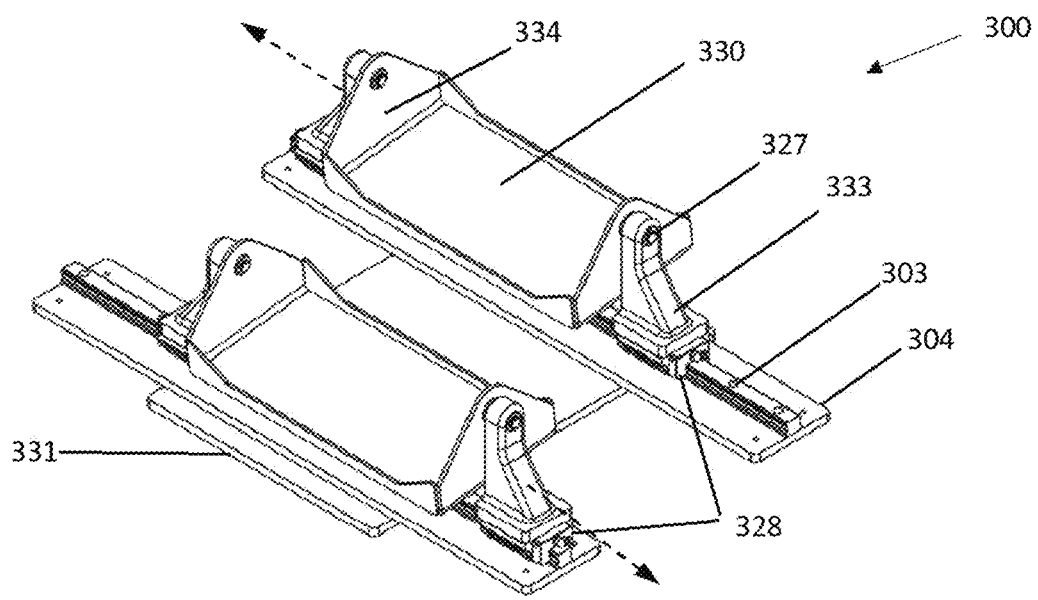
Figure 28:
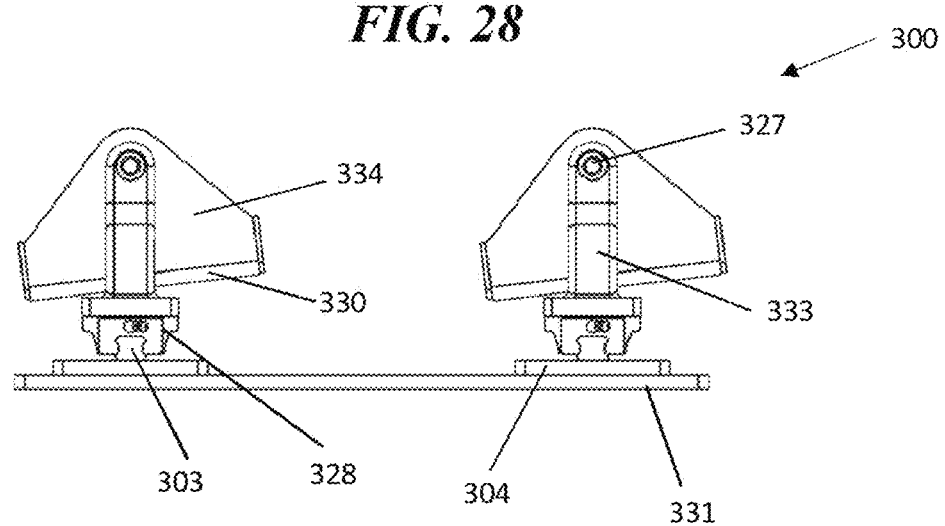

The quick release skewer lock 356 and its related components are presented in more detail in FIG. 25. The quick release skewer lock 356 is threaded through the metered board 355 as described above. It is also threaded through the shuttle with flanges 358 that travels within the slit 370 along the middle of the top plate 360. The shuttle with flanges 358 incorporates bushing 357 to reduce the freedom of movement of the quick release skewer lock's pin. A cone shaped tapered bearing 359 is installed below the shuttle with flanges 358 and is secured by the cap 329 at the bottom. The tapered bearing 359 travels only within the slit 326 along the middle of the bottom plate 364.

FIG. 26 a cross sectional view of the linkage system, which shows how the quick release skewer lock 356 locks the linkage system to secure position of the lock's pin within slits 370 and 326. The inner edge track of the slit 326 is angled to accommodate the cone shape of the tapered bearing 359. When the user locks the quick release skewer lock 356 and its pin is pulled up, the cone shape of the tapered bearing 359 moves up into the angled inner edges of the slit 326. This locking pull force secures the tapered bearing 359 inside the slit 326 without hindering its motion within it.

There may be other alternative means by which position of the pin can be fixed along slits 370 and 326 in the top plate 360 and bottom plate 364. For example, straight slits 370 and 326 can be replaced with holes (not shown) and the position of the pin can be fixed by inserting the pin through such holes. Alternatively, the pin can travel along a lead screw that can be installed along the elongated section of top plate 360.

The linkage system can be placed on one end of the device, as shown on FIGS. 17-30, or on both ends of the device (not shown). The linkage system replaces the vertical resistance springs 221 described in the embodiment 200.

The user platform 346 in this embodiment 300 is connected to and is placed directly on top of the vertical pivots 344 without any vertical connection bars that are similar to vertical bars 245 in the embodiment 200) All other components of this embodiment 300 are substantially the same as in embodiment 200 and have the same functionalities and therefore are not repeated here.

In practice the user would be positioned atop the user platform 346 on foot mounts 330 and can affect rotational movements of the user platform 346 in the horizontal plane by moving their body around the vertical axis B-B and concurrently affect a lateral tilt or pivot of the user platform 346 around the horizontal A-A axis. The user starts in the central position and then as he rotates the user platform 346 in one direction, it starts to tilt. The user then rotates the user platform 346 in the opposite direction and the direction of the tilt changes as well. The user would continue to traverse through a series of undulating motions culminating in a physical workout, rehabilitation or general skill training session.

The exercise device embodiment 300 of this invention includes a removable ski module described on FIGS. 27-30. The ski module consists of foot mounts 330 in the form of cradles with mounting members 334 that are suspended above the ski foot base 331. The mounting members 334 (and therefore the foot mounts 330) and are pivotally attached on pivots 327 to vertical supports 333. The vertical supports 333 are mounted on the linear bearings 328 that slide horizontally on tracks or rails 303. The tracks or rails 303 are substantially parallel to each other. The foot mounts 330 pivot in a direction substantially perpendicular to the track. The linear bearings 328 create horizontal movement of foot mounts 330 back and forth along the tracks or rails 303. The linear bearings 328 and rails 303 are mounted on the support plates 304. The support plates are mounted on the ski foot base 331 and can be moved horizontally side to side to increase or decrease the width of the user's stance.

Figure 29:
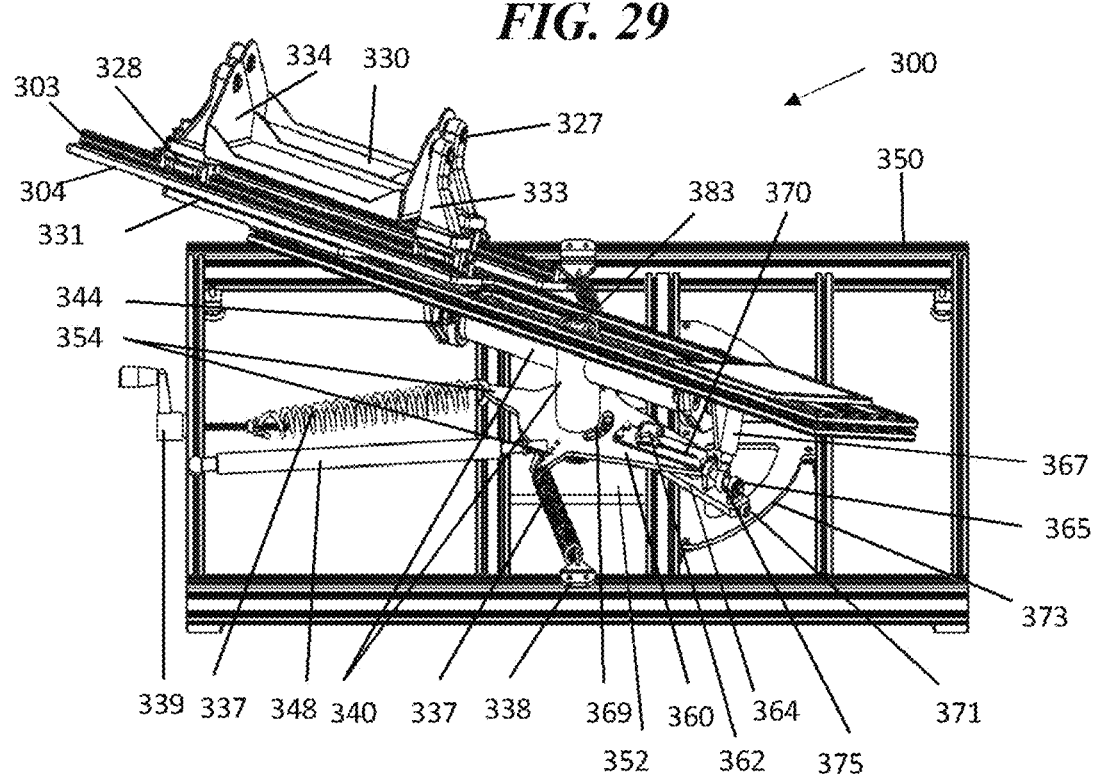
Figure 30:
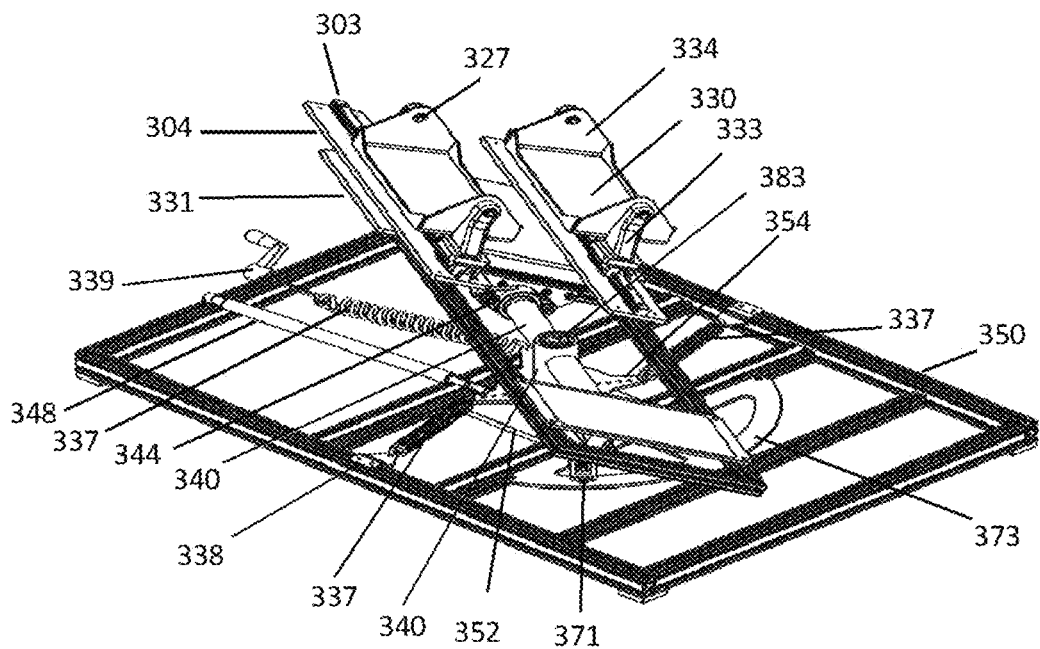
Figure 31:
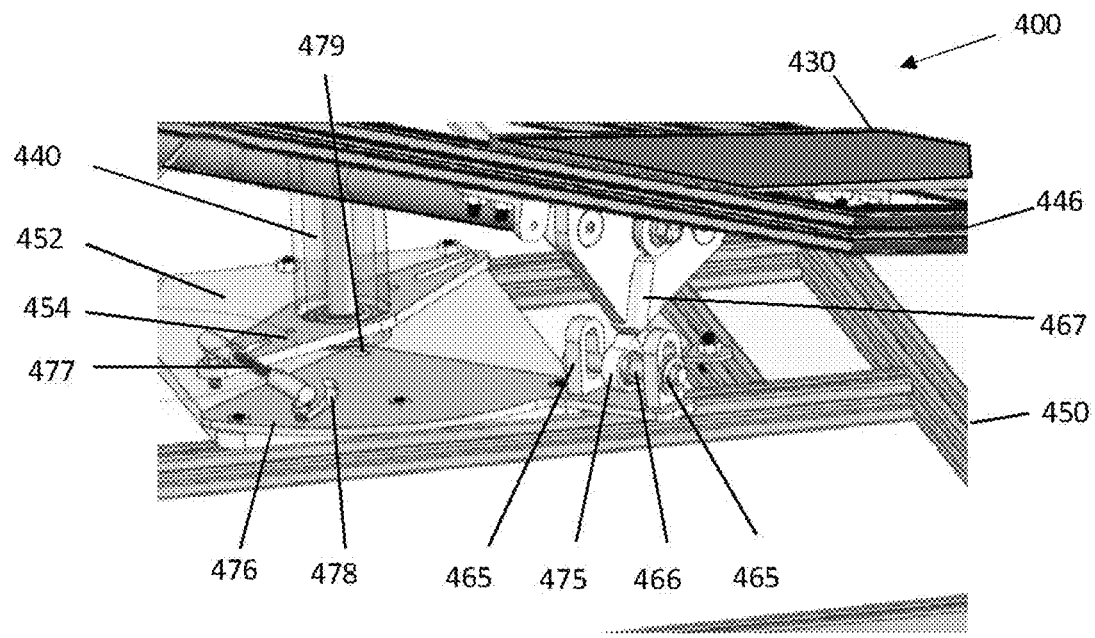
Figure 32:
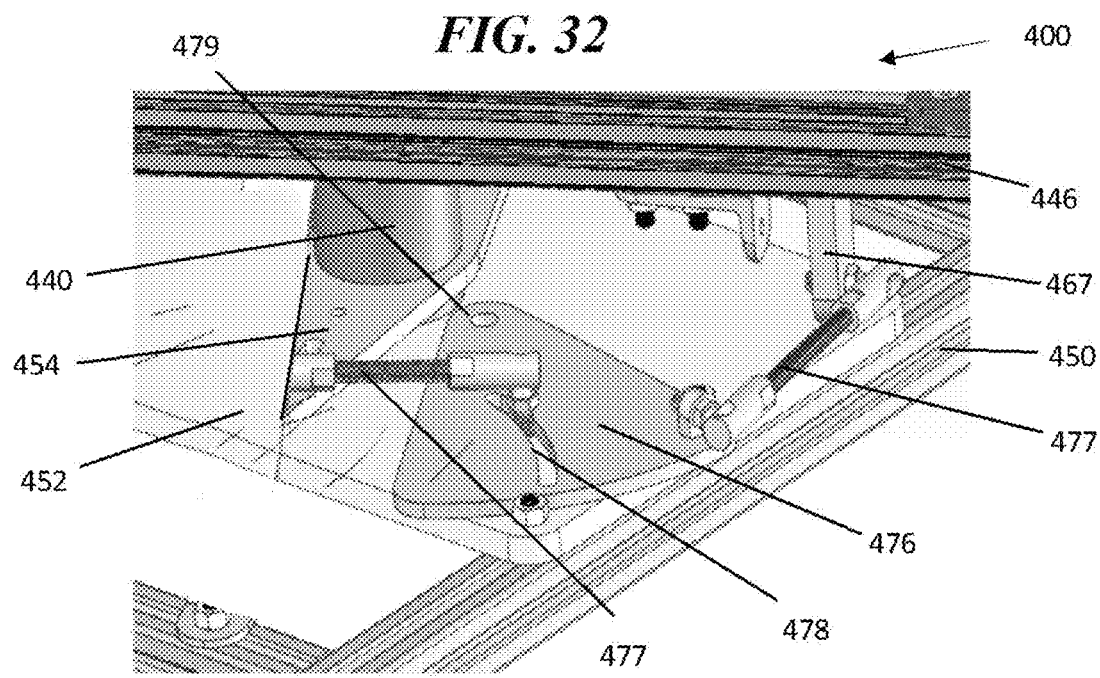
Figure 33:
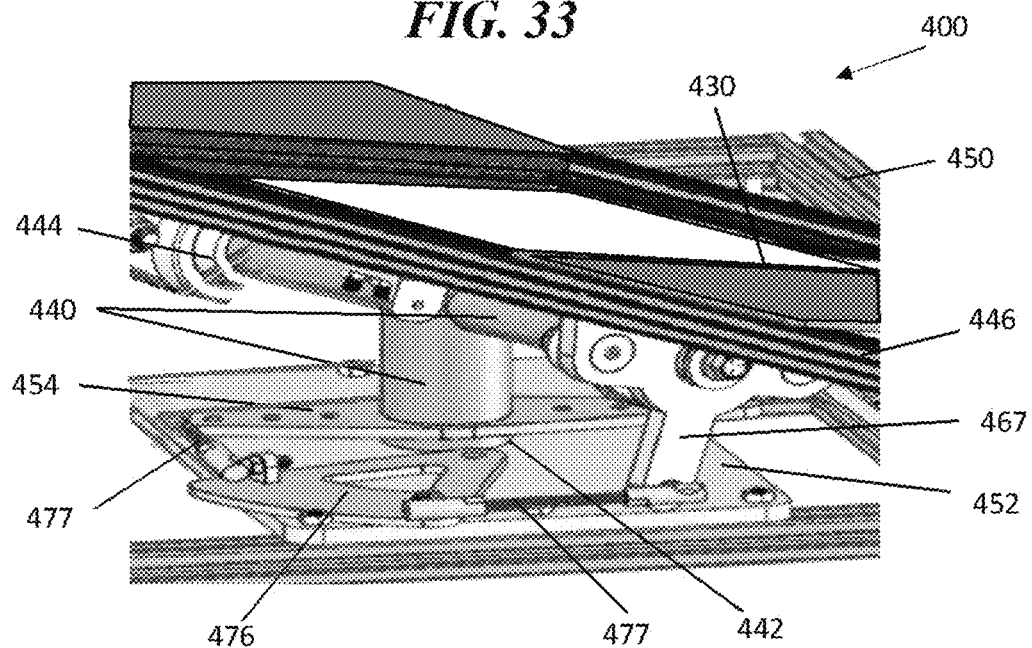
Figure 34:
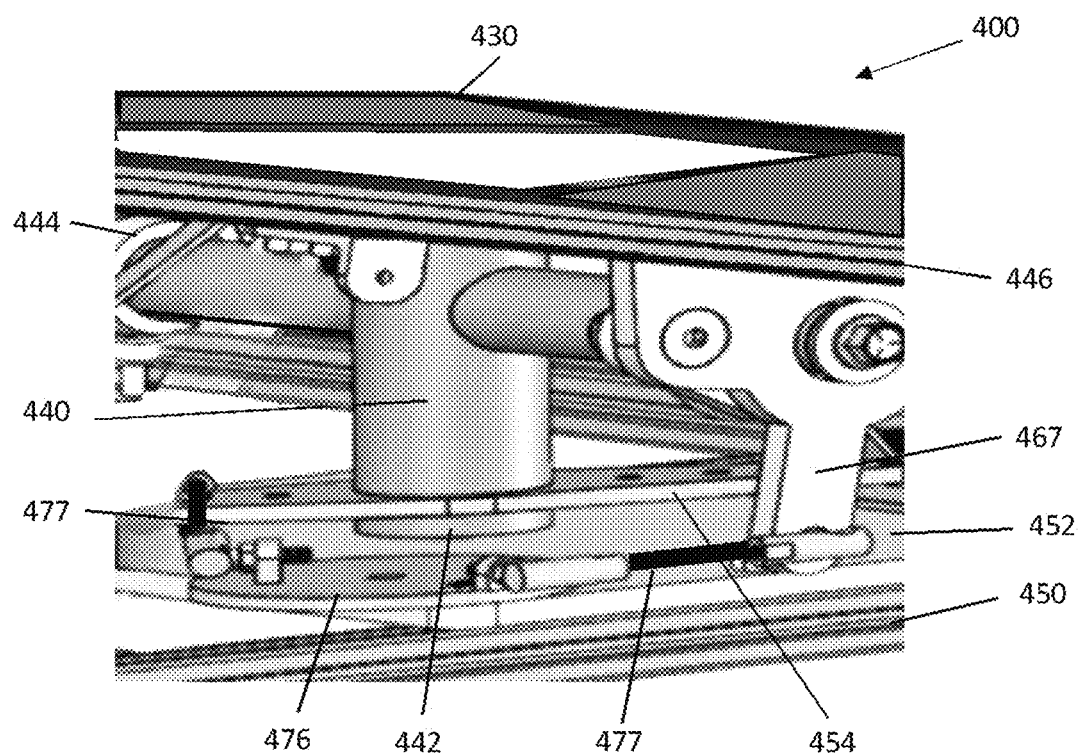
Figure 35A:
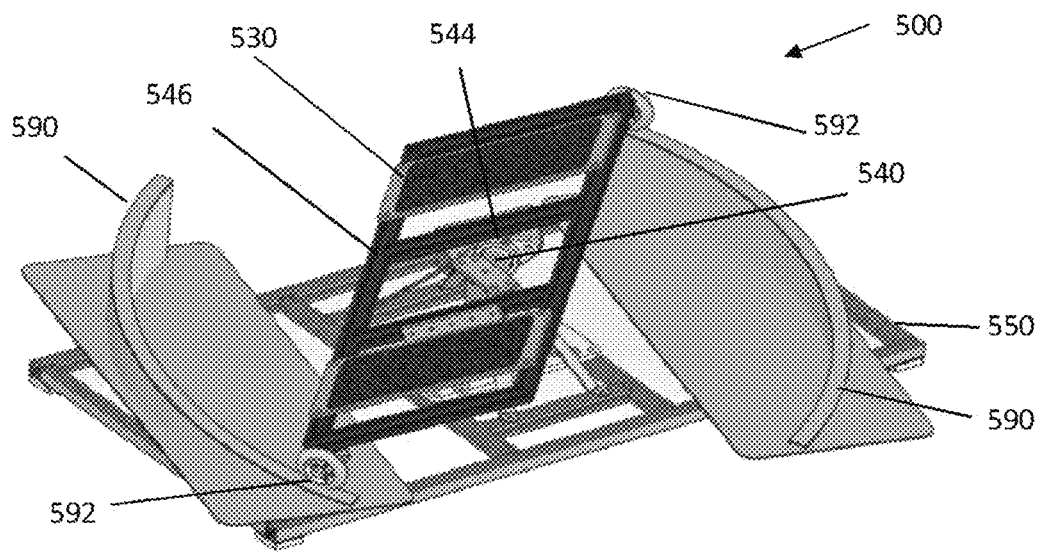
FIGS. 35-38 are images illustrating an embodiment of the exercise device of this invention 500 whereby the lateral tilt or pivot of the user-platform 546 around the horizontal A-A axis (i.e., angle of pivot of the platform 546 in the vertical plane) is controlled by adjustable or removable arced set of ramps, rails or tracks 590 and mating rollers (bearing wheels) 592.
Figure 35B:
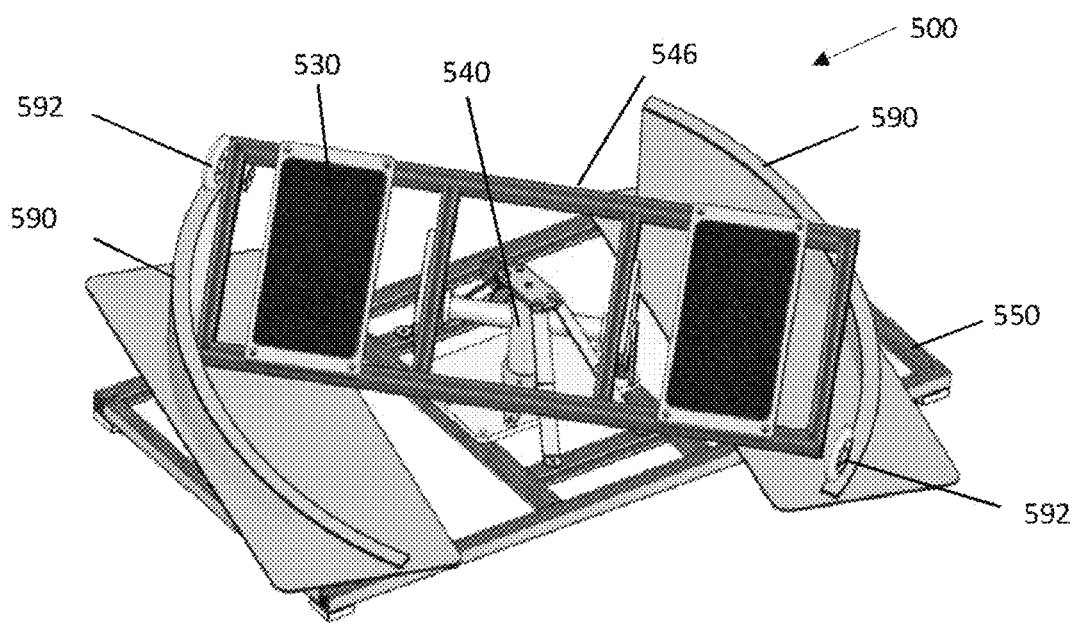

FIGS. 29-30 are perspective views from the top lateral side of the exercise device 300 with the ski module mounted on top and at the end of user platform 346. When the user platform 346 pivots or rotates, the foot mounts 330 move side to side, thus enhancing the simulation of edging of skis (i.e. pronation and supination movement in alpine skiing). In addition, the foot mounts 330 moves horizontally back and forth along rails or tracks 303. There may be springs, dampers or other resistance mechanism installed along the rails or tracks 303, for example between the support plates 304 and vertical supports 333. These resistance mechanisms will create resistance to horizontal movements of foot mounts 330 along the rails or tracks 303. In addition to pronation and supination pivotal movement of foot mounts 330, this horizontal back and forth movement of foot mounts 330 along the rails or tracks 303 creates even more realistic ski sensation because it allows users to put more weight on the outside leg when rotating the user platform (i.e., lateral weight distribution) and shift the inside leg forward to always keep the toes in a line that is parallel to user's shoulders throughout the turn. Alternatively, the foot mounts 330 for ski position may be linked through a system of bars, cables or other linkages (not shown) to other parts of the device in a way that would make them automatically move back and forth in a horizontal plane as user platform 346 rotates around the vertical axis B-B. Additionally, the foot mounts 330 for ski position may incorporate a removable heel ramp (not shown) that can be placed under the ski foot base 331 on its heel side to lift up the user's heels and further simulate a downhill ski slope.

The magnitude of lateral tilt or pivot of the user platform 346 in the vertical plane around the horizontal axis A-A can be controlled by other variations of linkage systems. For example, FIGS. 31-34 depict alternative linkage mechanisms that utilize rotating plate 476, which can be of different shape or form. One end of the rotating plate 476 is connected through a horizontal bar 477 to mounting arm 454 that are attached to support post 440. The other end of the rotating plate 476 is connected to vertical bar and/or telescopic tube 467 either directly, as in FIG. 31 or through horizontal bars 477, as in FIGS. 32-34. The vertical bar and/or telescopic tube 467 is connected to the user platform 446. The rotating plate 476 pivots around vertical pin or bolt 479 that attaches that plate to horizontal support mount 452 or directly to base 450. As the mounting arms 454 rotate with the support post 440 and the user platform 446, they push on the horizontal bar 477, which in turn pushes the rotating plate 476 to rotate around that vertical pin or bolt 479. The degree of rotation around that vertical pin or bolt 479 determines the magnitude of lateral tilt or pivot of the user platform 446.

Such degree of rotation or pivot may be controlled by various methods. One such method is by changing position of horizontal bar 477 that is connected to mounting arms 454 along the openings or slit in the mounting arms 454. When the horizontal bar 477 is moved closer to the end of the mounting arm 454, the rotating plate 476 increases its degree of rotation around the vertical pin or bolt 479, which pushes more on the vertical bar and/or telescopic tube 467 thus increasing its angle, which in turn will increase the angle of platform 446. The rotating plate 476 may have a slit (such as slit 478 on FIGS. 31 and 32) along which the horizontal bar 477 will slide once it is moved along the openings or slit in the mounting arms 454. Alternatively, the rotating plate 476 may not have a slit (such as plate 476 shown on FIG. 33-34). In another variation of the linkage system (not shown above), the user platform can be linked to the mounting arms 454 or directly to the support post 440 through a system of cables (replacing the horizontal bars 477) and pulley wheels (replacing the rotating plate 476).

FIGS. 35-38 of the exercise device of this invention 500 depict alternative mechanisms to control the tilt of the user platform 546. This embodiment utilizes the same elements of exercise device 300 to affect horizontal rotation, pivoting and dampening means. However, in this embodiment 500 the linkage system is replaced with adjustable or removable arced set of ramps, rails or tracks 590 and rollers (bearing wheels) 592 to control the angle of the lateral tilt or pivot movements of the user platform 546 around the horizontal A-A axis. The ramps, rails or tracks 590 can be placed at both ends of the device, as shown in FIGS. 35A and 35B, or only at one end of the device (not shown). The angles of the ramps, rails or tracks 590 may be adjusted (e.g., by elevating one side of the ramps, rails or tracks) in order to control the amount of lateral tilt or pivot movement of the user platform 546 around the horizontal axis A-A. Alternatively, a ramp, rail or track can be removed and substituted with another ramp, rail or track that has a steeper or flatter angle. Mounted under the user platform 546 are rollers (bearing wheels) 592 that are diagonally disposed as can be seen in the drawings (or they can be attached to all four corners of the user platform 546). In practice the user would be positioned atop the user platform 546 on foot mounts 530 and can affect rotational movements of the user platform 546 in the horizontal plane by moving their body around the vertical axis B-B and concurrently effect a lateral tilt or pivot of the user platform 546 around the horizontal A-A axis.

Other than the ramps, rails or tracks that control the tilt or pivot of the user platform 546, the elements of the device 500 and their functionalities are the same as the elements from the previous embodiment 300 and therefore they are not repeated here.

Figure 36:
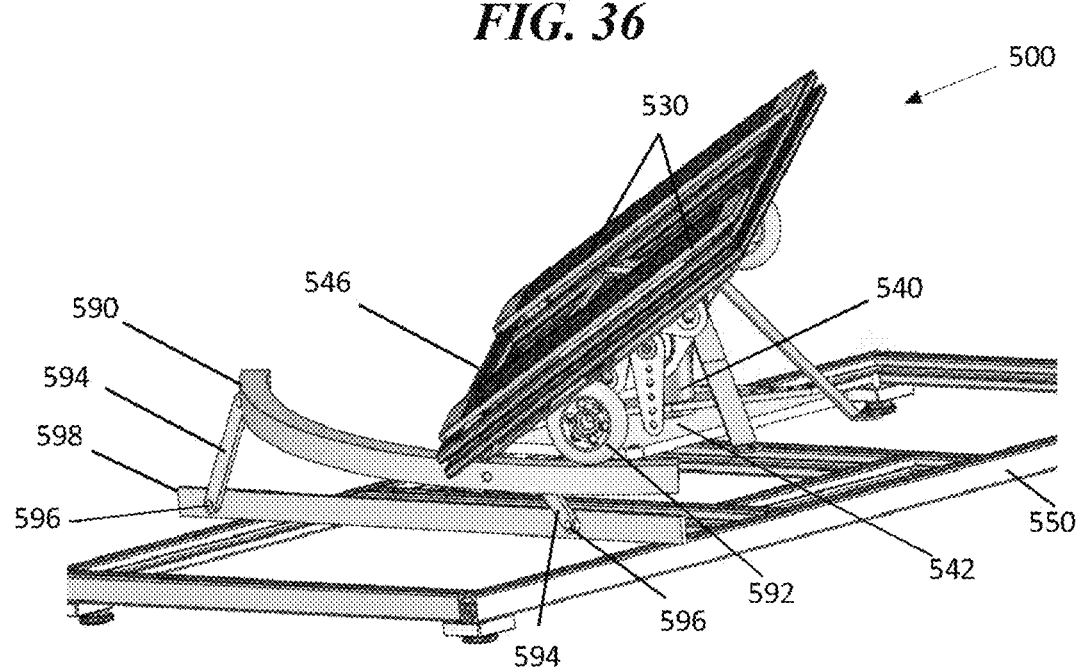

FIG. 36 is an image of a portion of the exercise device 500 representing a variation of rails, tracks or ramps that allows to control the overall lateral tilt or pivot of the user platform 546 around the horizontal A-A axis. If both ends of ramps, rails or tracks are level, then the ramps, rails or tracks will provide a relatively gentle ride with small lateral tilt or pivot of the user platform 546 around the horizontal A-A axis. If one end of ramps, rails or tracks is raised above the other end then the angle of ramps, rails or tracks will increase and result in extreme ride with large lateral tilt or pivot of the user platform 546 around the horizontal A-A axis. This can be achieved by having the arced ramps, rails or tracks 590 attached to adjustable lever arms 594 that are pivotally attached at 596 to a mounting member 598 that is transversely mounted to base 550. Vertical movement and height of arced ramps, rails or tracks 590 can be controlled by mechanical means, such as lead screws, or electronic means (not shown) in order to control the rate of travel as desired. By increasing or decreasing the angle of the lever arms 594, the angle of arced ramps, rails or tracks 590 are raised or lowered in the vertical plane. Such arced ramps, rails or tracks 590 can be installed on one side or on both sides of the base 550 (opposite each other). The amount of lateral tilt or pivot of the user platform 546 around the horizontal A-A axis is determined by the geometry and height of the arced portions of ramps, rails or tracks 590.

Figure 37:
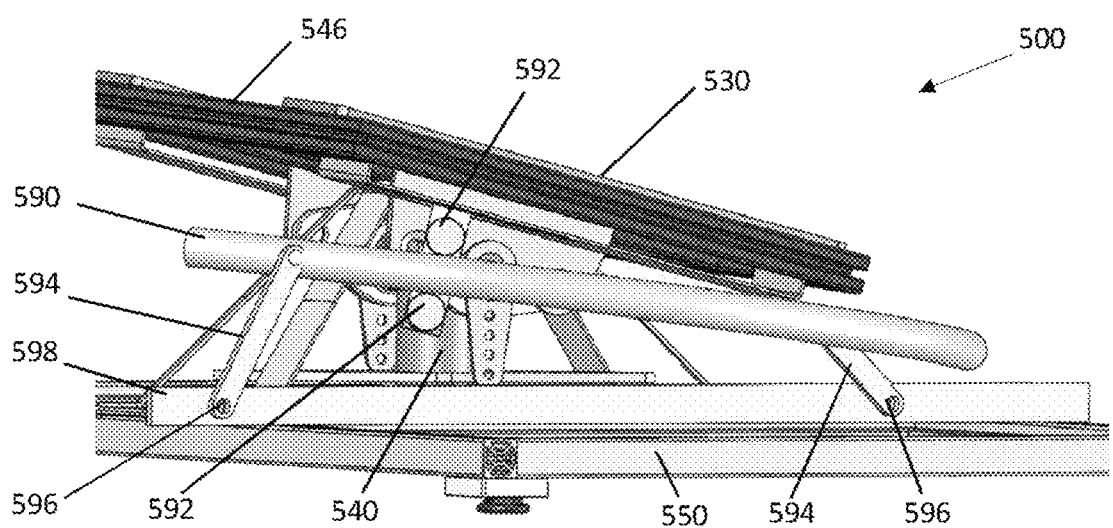

FIG. 37 is an image of portion of the exercise device 500 showing another variation of rails, tracks or ramps that controls the tilt of the user platform 546 around the horizontal A-A axis. This embodiment includes adjustable arced rails or tracks with two rollers (bearing wheels) 592, one positioned above the ramp, rails or track 590 and one below.

Figure 38:
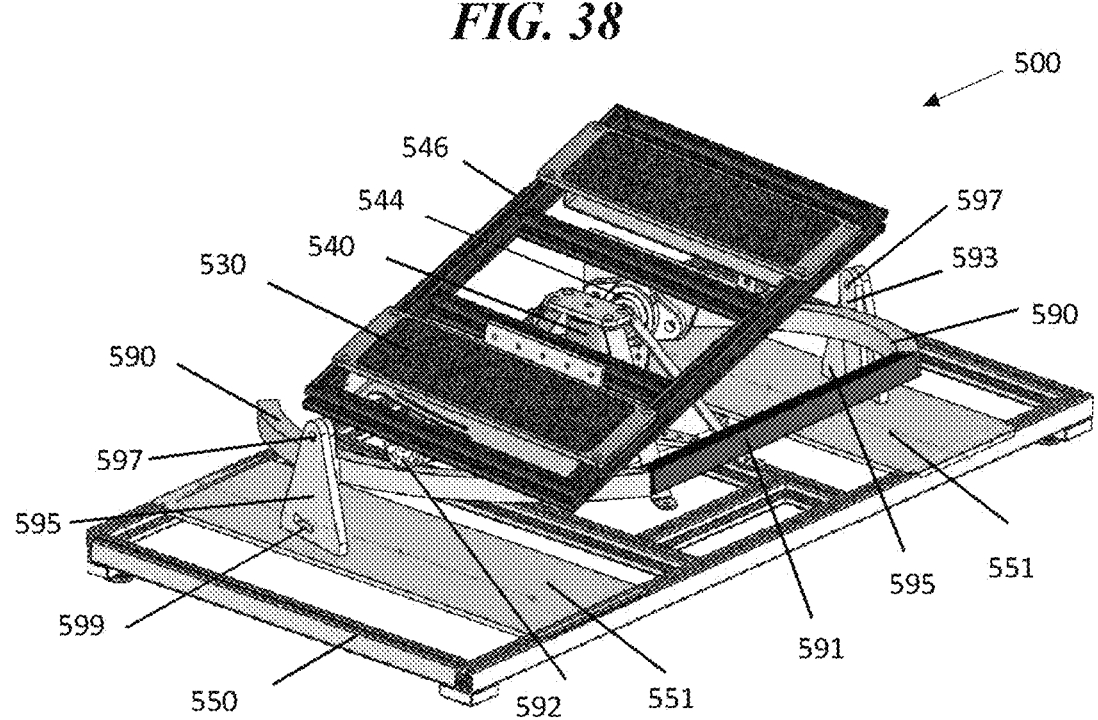

FIG. 38 is an image of a portion of the exercise device 500 showing another variation of ramps, rails or tracks mechanism that control the tilt of the user platform 546 around the horizontal A-A axis. In this embodiment the two arced ramps, rails or tracks 590 are unified by a horizontal cross-piece 591 in order to pair or synchronize their height adjustment. Another way of pairing or synchronizing their height adjustment is by electronic means or mechanical means, such as by connecting the ramps, rails or tracks 590 with lead screws (not shown). Each arced ramp, rail or track 590 is affixed to pivoting linkage arms 593 that can rotate via upper pivot points 597 located at the upper portion of vertical support plates 595. Vertical support plates 595 are fixed to transverse mounting plates 551, which are attached to the base 550. The pivoting linkage arms 593 have a predisposed amount of rotational travel allowed by way of slits 599 in plates 595 that limit the overall pivoting motion via stop means or lead screws (not shown) attached to the base 550. Similarly to the above, this embodiment creates a modified series of movements with adjustable lateral tilt or pivot of the user platform 546 around the horizontal A-A axis based on the geometry and height of the arced portions of the ramps, rails or tracks 590.

In any variation of this invention the magnitude of lateral tilt or pivot of the user platform in the vertical plane around the horizontal axis A-A can be controlled by many other types of rails, ramps or track systems.

FIGS. 39-40

Figure 39:
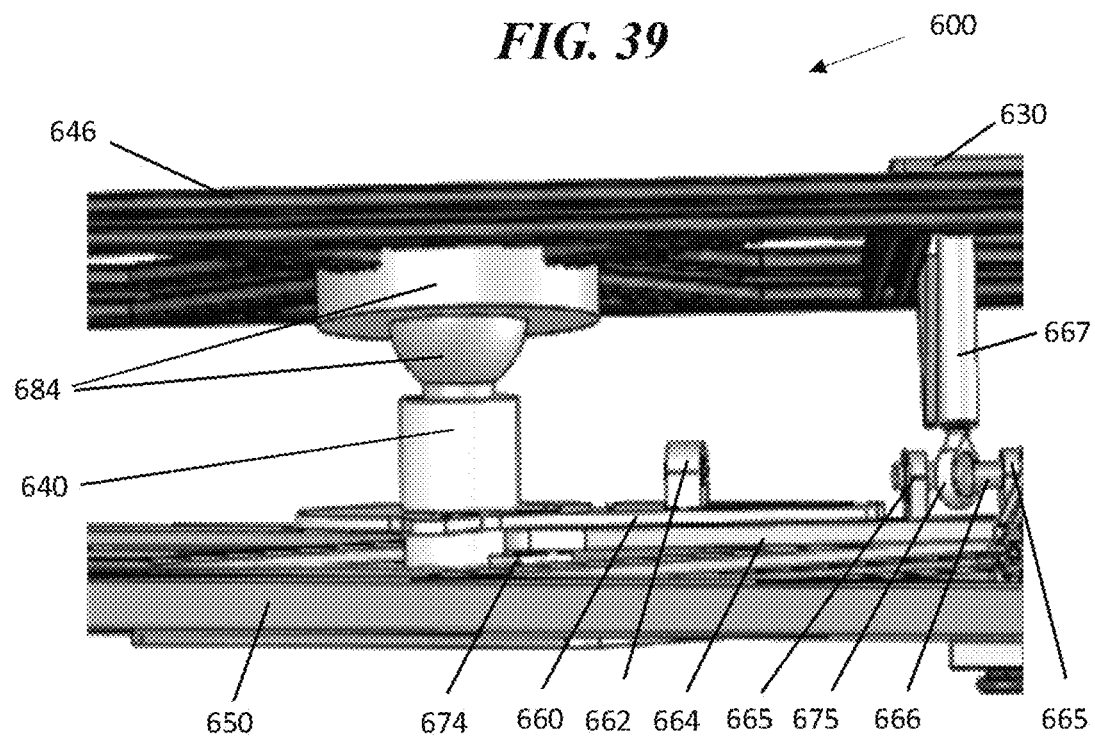
FIGS. 39-40 illustrate the exercise device of this invention 600 with alternative designs of the support post 640. The support post 640 is connected to a spherical bearing/ball joint 684 that provides interface between the support post 640 and the user platform 646. The spherical bearing/ball joint 684 allows the user platform 646 to rotate with a complete degree of freedom and can in any direction, including up, down, left or right. However, any ramps, rails or linkage mechanisms described herein would limit the degree of freedom of rotation of the user platform 646. The support post with a spherical bearing/ball joint can be incorporated in any embodiment of this invention from 100 through to 500 described herein.
Figure 40:
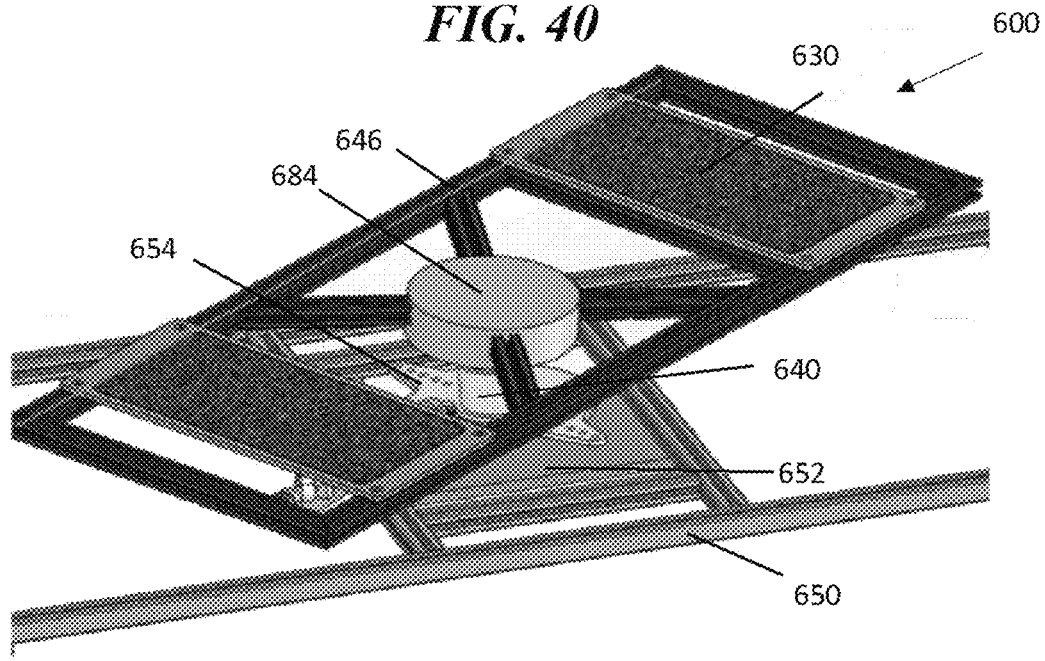

FIGS. 39 and 40 show yet another embodiment of the exercise device of this invention 600. This design utilizes any of the elements from the previous embodiments 100-500. However, instead of the vertical pivots (described as 244, 344, 444, and 544 in previous embodiments) and central horizontal pivot (described as 242, 342, 442, and 542 in previous embodiments), the lateral tilt or pivot of the user platform around the horizontal axis A-A and horizontal pivot of the user platform in horizontal plane around the vertical axis B-B are created by the spherical bearing/ball joint 684 mounted to the support post 640. The support post 640 in this embodiment 600 consists only of a vertical column section and does not include cross bar section. Spherical bearing/ball joint 684 is installed on top of the support post 640 and under the user platform 646. Alternatively, spherical bearing/ball joint 684 may be positioned under the support post 640 and on top of the base 650 (such position is not shown on the drawings). User platform 646 has complete degree of freedom because of spherical bearing/ball joint 684 and can move in any direction, including up, down, left or right. However, any ramps, rails or linkage mechanisms described in embodiments 300 through to 500 would limit the degree of freedom of rotation of user platform 646 and create a smooth yet stable and guided lateral tilt or pivot movements of the user platform around the horizontal axis A-A and horizontal pivot of the user platform in horizontal plane around the vertical axis B-B.

FIGS. 41-43

Figure 41:
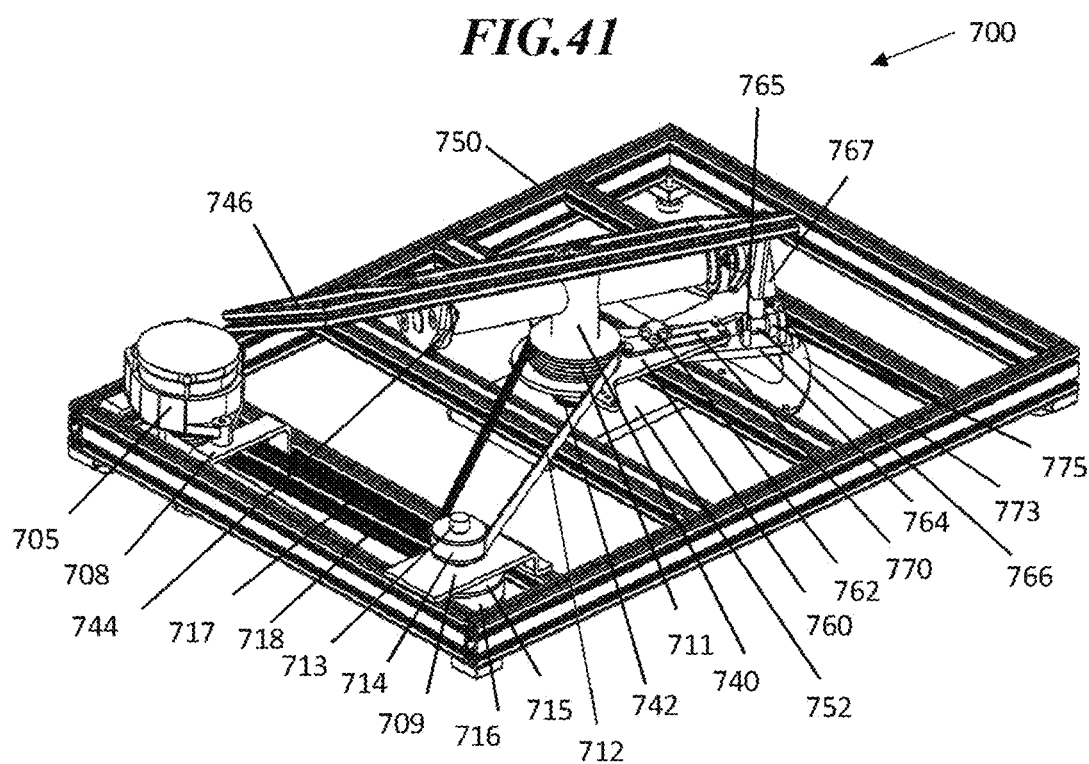
FIGS. 41 through 43 illustrate an embodiment of the exercise device 700 of this invention, which includes electronic alternator-based system of horizontal resistance of the user platform 746. This alternator-based resistance system can be incorporated in any embodiment of this invention from 100 through to 600 described herein.
Figure 42:
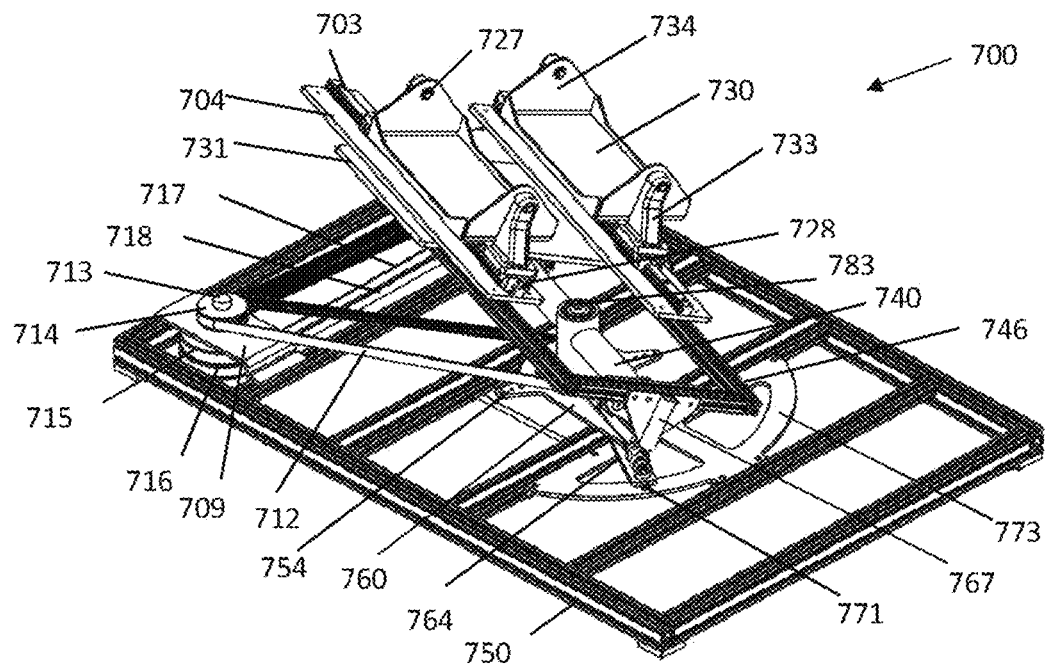
Figure 43:
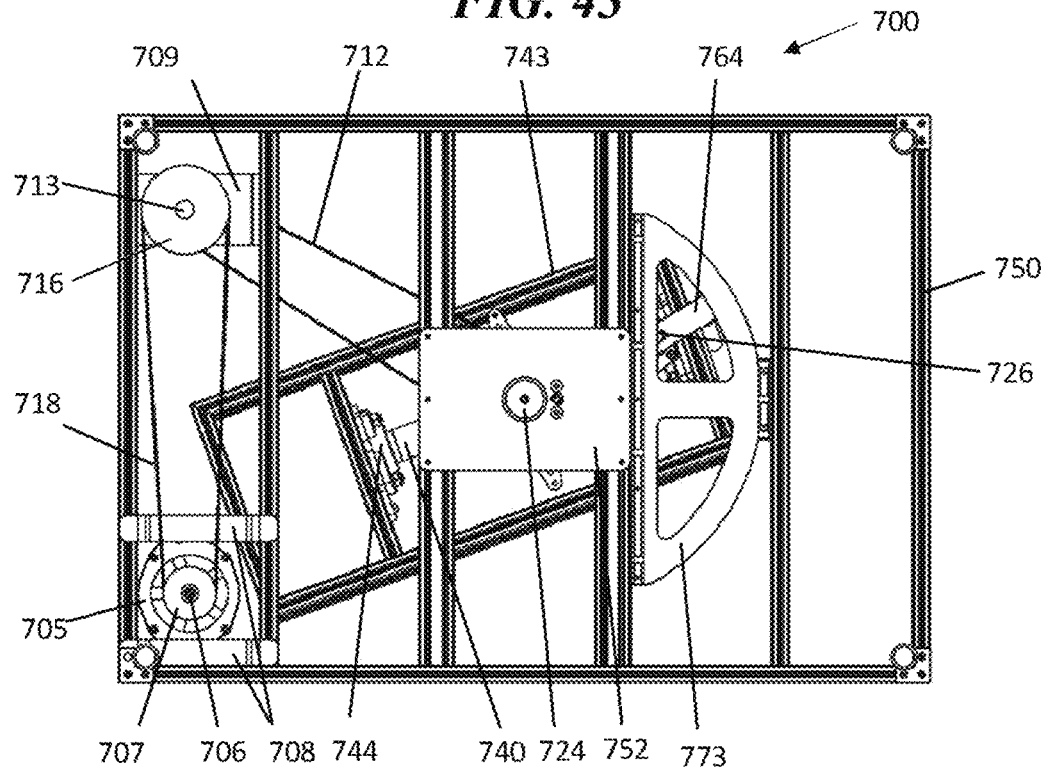

The horizontal rotation resistance of user platform in any embodiment of the device 100 through to 600 can be controlled by an alternator-based system, which is further described in the embodiment of the device 700 on FIGS. 41-43. With the exception of the alternator-based horizontal resistance system, the elements of the device 700 and their functionalities are the same as the elements from the previous embodiment 300 and therefore they are not repeated here. The horizontal rotation resistance is controlled by an alternator-based system. FIG. 41 is a perspective view from the top lateral side of the exercise device 700. This embodiment 700 includes the user platform 746 (with or without the ski module) mounted on top of the vertical pivots 744 that are installed on each side of the cross-bar section of support post 740. The support post 740 is mounted on top of the horizontal support mount 752 and includes central horizontal pivots 742. The tilt or pivot of the user platform 746 is guided by the linkage system that includes top plate 760, bottom plate 764, vertical bar and/or telescopic tube 767 and all other elements of the linkage system described in the embodiment 300 above. FIG. 42 is a perspective view from the top lateral side of the exercise device 700 described in FIG. 41 but with the ski module attached to the user platform 746. FIG. 43 is a view of the exercise device 700 from the bottom.

The alternator-based horizontal rotation resistance system in the embodiment of the exercise device 700 consists of the central pulley or sprocket 711 at the bottom of the support post 740. A central belt 712 connects the central pulley or sprocket 711 to the gear pulley or sprocket 714 that is mounted on the gear mounting member 709. The gear carrier post 713 connects the gear pulley or sprocket 714 to the drive pulley or sprocket 715 underneath it and to planetary pulley or sprocket 716 underneath the drive pulley or sprocket 715. The planetary pulley or sprocket 716 includes a standard planetary or other gear system (not shown) that causes that pulley to spin in the opposite direction to the rotation of the gear carrier post 713. As a result, as gear pulley or sprocket 714 spins in one direction, the drive pulley or sprocket 715 spins in the same direction and the planetary pulley or sprocket 716 spins in the opposite direction. The planetary pully or sprocket 716 is connected by bottom alternator belt 718 to the bottom alternator pulley 707 (as seen on FIG. 43). The drive pulley or sprocket 715 is connected by the top alternator belt 717 to top alternator pulley or sprocket (not shown), which sits directly on top of the bottom alternator pulley or sprocket 707. Both the top and bottom alternator pulleys or sprockets are exactly the same in their shape or form and are referenced as the alternator pulleys or sprockets 707 herein. The alternator pulleys or sprockets 707 are threaded through the shaft 706 of the alternator 705. These alternator pulleys or sprockets 707 incorporate clutch bearings that allow the alternator pulleys or sprockets 707 to engage the alternator shaft 706 only when the alternator pulleys or sprockets 707 are rotated in one direction (e.g. clockwise). If the alternator pulleys or sprockets 707 are rotated in the other direction (i.e. counterclockwise), the clutch bearings overrun and cause the alternator pulleys or sprockets 707 to spin freely and therefore do not engage the alternator shaft 706. The alternator 705 is mounted on the alternator mounting members 708.

When the user platform 746 and support post 740 turn clockwise, the central pulley or sprocket 711 also turns clockwise and causes the drive pulley or sprocket 715 to turn clockwise. The drive pulley or sprocket 715 causes the top alternator pulley or sprocket 707 to turn clockwise and the clutch bearing will lock with alternator shaft 706 to turn it clockwise. At the same time, the central pulley or sprocket 711 causes the planetary pulley or sprocket 716 to turn counterclockwise (i.e. in the opposite direction to the central pulley or sprocket 711) because of the planetary or other gears reversing its direction. The planetary pulley or sprocket 716 causes the bottom alternator pulley or sprocket 707 to also turn counterclockwise (i.e. in the opposite direction to the central pulley or sprocket 711) and the clutch bearing overrun and cause the bottom alternator pulley or sprocket 707 to spin freely without engaging the alternator shaft 706. When the user platform turns counterclockwise, the central pulley or sprocket 711 also turns counterclockwise and causes the drive pulley or sprocket 715 to turn counterclockwise. The drive pulley or sprocket 715 causes the top alternator pulley 7 or sprocket 07 to also turn counterclockwise and the clutch bearing will overrun and cause the top alternator pulley or sprocket 707 to spin freely without engaging the alternator shaft 706. At the same time, the central pulley or sprocket 711 causes the planetary pulley or sprocket 716 to turn clockwise (i.e. in the opposite direction to the central pulley or sprocket 711). The planetary pulley or sprocket 716 causes the bottom alternator pulley or sprocket 707 to also turn clockwise and the clutch bearing will lock with alternator shaft 706 to turn it clockwise. Thus, the torque will continue transmitting to the alternator shaft 706 only in one (clockwise) direction.

The alternator 705 serves as a break on rotation of the alternator shaft 706. The alternator-based horizontal rotation resistance system includes a control panel with a plurality of computer control programs that allow the user to change the level of resistance applicable to the alternator shaft 706, thus creating a dynamic electronic resistance on the rotation of the user platform.

The degree of lateral tilt or pivot of the user platform around the horizontal A-A axis and horizontal rotation resistance of such user platform when it is rotated or pivoted around vertical B-B axis can be adjustable electronically in any embodiment of the device 100 through to 600. In particular, the lateral tilt or pivot of such user platform around the horizontal A-A axis could be adjusted by an electronic motor or electronically controlled hydraulic mechanism. Additionally, horizontal rotation resistance of such user platform could be adjusted by an electronic system that progressively activates brakes applied to horizontal rotation, or by dampers that adjust electronically, or by actuators that electronically change the position of the dampers and thus alter their resistance.

Safety Rails, Handles, Bars or Poles

Any embodiment of the device 100 through to 700 may include safety rails, handles, bars or poles, which could be removable or adjustable. Such safety rails, handles, bars or poles can be stationary attached to any part of the device 100 through to 700, including the base (described as 250, 350, 450, 550 or 650 on the drawings included herein) or horizontal support mount (described as 252, 352, 452, 552, or 652 on the drawings included herein). Safety rails, handles, bars or poles can also be attached to any horizontally rotating part of the device so that they rotate horizontally around B-B axis with a user of the device and user platform. For example, safety rails, handles, bars or poles can be attached to the mounting arms (described as 254, 354, 454, 554, or 654 on the drawings included herein) or directly to support post (described as 240, 340, 440, 540, or 640 on the drawings included herein). The safety rails, handles, bars or poles may incorporate controls or buttons (not shown) for gaming to control the video games or other electronic interfaces with the device, as further described herein. The safety rails, handles, bars or poles may be positioned along the exercise device for snowboarding stance or perpendicular to the exercise device for skiing stance. In addition, the safety rails, handles, bars or poles may be used to attach a harness that would assist the user with balancing on the device (not shown).

The device may also include an electronic control panel or touch screen to control the degree of lateral tilt or pivot and horizontal rotation resistance. This can be done by choosing the appropriate levels or by selecting pre-programmed modes that would automatically adjust the level of tilt and resistance throughout the ride and during the chosen exercise time. The panel would also have standard indicators such as time, calories lost, level of resistance and tilt etc.

Each of embodiments of the device 100 through to 700 can be transformed into a gaming controller device by fitting it with motion sensors, potentiometers, accelerometers, strain gauges, weight sensor, pressure sensors or other electronic instruments. These instruments can be attached to or incorporated in any part of the device 100 through to 700 (including under or within the foot pads, on or within the user frame or base of the devise, on or inside the support post etc.) and can capture the athlete's body movements, level of intensity, changes in the rate of motion, weight transfer and balance and transform them into electronic signals that can control video games and transmit them on a video panel, monitor or Virtual Reality glasses.

Each embodiment of the exercise device described herein creates "carving" simulation through the combination of lateral tilt or vertical pivot (to simulate "edging" motion, i.e., hill to toe movement used in snowboarding or pronation and supination movement used in alpine skiing) and horizontal rotation movement. It uses a synergistic balance of resistance elements, (e.g., dampening piston struts, springs or other dampening means described herein) and pivot points between the base, the support post and user platform to create a smooth, realistic simulation of the real world movements in motion sport activities.

Broadly, the exercise device of this invention allows recreational athletes to engage in an intense cardio and muscle-building activity. Users exercise their lateral abdominal, lower back and leg muscles by making broad left and right turns with their torso. In addition, they can control the tilt of the user platform and the resistance level of their turns. As the angle of tilt increases, the machine naturally forces the users into a position that automatically engages their core, quads, glutes, and hamstring and calve muscles. By increasing the level of turn resistance, athletes can amplify the level of intensity of the workout. The users can also change their stance on the user platform, for example from a snowboarding stance, to a surfing stance or skiing stance. This adds variation to the exercise keeping the user engaged for a longer period of time, making the exercise less boring and allows the user to target the muscle groups from different angles. Custom designed exercise routines and or programs can be created for the athletes that utilize the unique movements produced by the exercise device to train the upper body muscles, including chest, shoulder and triceps muscles. As a result, the machine offers an exhausting full body workout to recreational users.

Other users engaged in motion sports, such as skiing, snowboarding, surfing, skateboarding, water skiing, wakeboarding or kite boarding can reap tremendous benefits from the exercise device of this invention. There are few athletes that have daily access to training in these sports, typically requiring travel to warmer or colder destinations. The cost of travel and hotel expenses and daily job commitments prevent most motion sport enthusiasts from engaging in these activities more than once or twice per year. Even those, who can indulge in motion sports more often, are constrained by shorter seasons and unpredictable weather patterns. As a result, many recreational participants engage in these sports without proper conditioning and spend most of their trip on dealing with muscle soreness and discomfort.

The exercise device simulates the movements produced by motion sport athletes and is designed to provide a workout that maintains muscle conditioning, improves balance, stability and endurance that are necessary for motion sports. In any embodiment of the exercise, by changing the position of foot mounts on the user platform or board, the user can select the stance that corresponds to the applicable motion sport. They can attach the foot mounts along the horizontal A-A axis in parallel, "duck" or other stance that is customary used on snowboarding, skateboarding, wakeboarding or kite boarding (see FIGS. 6C-6E). Or they can move the foot mounts further apart and attach them on an angle that produces the required stance for surfing (see FIG. 6B). Alternatively, the athletes can attach the foot mounts to one end of the machine while facing the other end to replicate downhill skiing or water skiing position (see FIG. 6A). Additionally, when the foot mounts are placed downhill skiing or water skiing position, any embodiment of the device 300 through to 700 may be pared with another such device and the two devices can be mounted on a common mounting base side by side. In this iteration, a user can place one foot on the user platform of one device and the other foot on the user platform of the second device and operate each user platform independently so that one user platform will serve as an individual "ski" for one foot and the other user platform will as an individual ski for the second foot.

For alpine sports enthusiasts, the lateral and rotational movements of the machine simulate the motion, whereas adjustments to the tilt and level of rotational resistance simulate the steepness of the hill and level of intensity. The users are able to use their body movement to control the width and angle of each turn.

A number of medical conditions and neurological disorders, such as Vertigo or Parkinson disease, multiple sclerosis or stroke may cause patients to experience some difficulty with balance or produce spinning sensation and thus put patients at risk of falling, affect their quality of life and interfere with their level of activity. The device can be used to introduce balance re-training into the therapy program. The motion of swaying and turning on the machine helps patients to gain better control of their body and reduce risk of falls. By gradually increasing the tilt and resistance of the machine, patients can further improve their balance, coordination, concentration, strength and reflexes.

Physical therapists or doctors can incorporate the machine into their treatment plans that aim to improve strength, flexibility and range of motion of people who suffered from knee and ankle injuries or are recovering from injuries to their quads, glutes, and hamstrings or calve muscles and therefore require balance and strength exercises to get back in shape.

The most difficult obstacles to the continuing usage of any exercise equipment are boredom and repetitiveness. Introducing fun into any fitness activity can remove these obstacles and motivate the athletes to engage in physical exercise. The exercise device of this invention can be used as a gaming controller that, when connected to a computer and video panel, monitor or Virtual Reality glasses, would allow users to transform their motions into electronic signals that control video games. The exercise device users will be able to combine their workouts with different video games, such as hover board races, skateboard contests, air fights, alpine or water sports races and obstacle runs. The users could choose levels depending on their fitness ability and engage in simulated skiing, snowboarding, skateboarding, wakeboarding, water skiing, kite boarding or surfboarding through various obstacles and terrains on video screens. Video games can provide athletes with instant visual feedback on their movements and improve their concentration, strength and reflexes. The video games combined with this exercise device can serve as strong drivers to motivate people to be more active and improve their fitness. In addition to a single mode, the exercise device will have capabilities to operate in a multiplayer mode or in a social competition mode that would allow athletes to compete with each other or other people online. Thus, exercise device will remove the strain of physical activity from athletes' conscience and allow them to exercise longer and more often. Additionally, the exercise device can be combined with video classes and specific exercise programs of various degrees of difficulty in order to enhance user experience. Such classes or programs can be either streamed live or downloaded and viewed on a video panel, monitor or Virtual Reality glasses.

The invention has been described with reference to various specific and illustrative aspects of the present invention and techniques. However, it should be understood that many variations and modifications may be made while remaining within the spirit and scope of the invention. Many alternatives, modifications and variations will be apparent to those skilled in the art in light of the foregoing description. Accordingly, this invention is intended to embrace all such alternatives, modifications, and variations that fall within the spirit and scope of the description.

ELEMENTS

FIGS. 1-7

| Part No. | Element |
| --- | --- |
| 100 | Exercise device |
| 110 | User |
| 120 | Board on top of the user platform 146 |
| 130 | Foot mounts for foot placement positions on board 120. Alternatively, the foot mounts can be mounted directly on top of the user platform (when the device is used without any board 120 placed on top of the user platform 146). |
| 146 | user platform mounted on top of support post (not shown). |
| 150 | Base (on ground). |
| A-A | Horizontal axis |
| B-B | Vertical axis |
| 180 | Sensors for gaming, physical data, motion data, which can be placed on the user platform 146, user board 120, support post or other parts of the device. |
| 181 | CPU - Game console - tablet - Virtual Reality glasses - computer - wired or wireless |
| 182 | Video monitor for viewing |

FIGS. 8-16

| Part No. | Element |
| --- | --- |
| 200 | Exercise device |
| 221 | Vertical resistance springs that create resistance for lateral tilt or pivot of the user platform 246 around the horizontal A-A axis. |
| 222 | Hex drive screw |
| 223 | Washer |
| 224 | Main shaft used for purposes of mounting the outer tube of the vertical column section of the support post 240 |
| 225 | Vertical column section of the support post 240 |
| 230 | Foot mounts |
| 237 | Horizontal resistance springs to modulate horizontal rotational movements of user platform 246 around the vertical axis B-B |
| 238 | Mounting members that attach horizontal resistance springs 237 to the base 250 |
| 239 | Spring adjuster (including a crank or other mechanism) adjusting the length of horizontal resistance springs 237 |
| 240 | Support post - interface between base 250 and user platform 246. The support post 240 consists of a vertical column section and horizontal cross bar section mounted on top of the vertical column section. The support post 240 rotates in the horizontal plane around the vertical axis B-B by means of the central horizontal pivot 242. The support post 240 and central horizontal pivot 242 are mounted on horizontal support mount 252 or they can be mounted directly on base 250. |
| 242 | Central horizontal pivot that creates rotation of the support post 240 (and of the user platform 246 attached to it) in horizontal plane around the vertical axis B-B. The central pivot can be located either below or inside the vertical column section of the support post 240 or between the horizontal cross bar section and vertical column section of the support post 240. |

-continued

| Part No. | Element |
|---|---|
| 244 | Vertical pivots that create lateral tilt or pivot of the user platform 246 around the horizontal axis A-A. |
| 245 | Vertical bars mounted on the vertical pivots 244. The user platform 246 is attached to these vertical bars. |
| 246 | User platform |
| 248 | Dampening piston struts-dampers to modulate horizontal rotational movements of user platform 246 around the vertical axis B-B |
| 250 | Base to which horizontal support mount 252, support post 240 and associated other parts above are mounted. The base may include wheels on one side for transport & storage. |
| 252 | Horizontal support mount for the support post 240 & associated other parts above |
| 254 | Mounting arms with holes or slits to attach dampers 248 or springs, elastic bands, or other types of resistance as further described herein to control resistance of horizontal movement of the device around the vertical B-B axis. The mounting arms can also be used to attach safety rails, handles, bars or poles. |
| 283 | Potentiometer on top of the support post 240 or on top of the connection that connects the support post 240 to central horizontal pivot 242 |

FIGS. 17-30

| Part No. | Element |
|---|---|
| 300 | Exercise device |
| 303 | Rails that are used in conjunction with the linear bearings 328 that allow the foot mounts 330 to slide horizontally |
| 304 | Support plates that are used for purposes of mounting the linear bearings 328, rails 303 and foot mounts 330. |
| 324 | Main shaft used for purposes of mounting the outer tube of the vertical column section of the support post 340 |
| 326 | Slit along the middle of bottom plate 364 |
| 327 | Pivots that are used to attach the foot mounts 330 to vertical supports 333 |
| 328 | Linear bearings that slide horizontally on rails 303. Foot mounts 330 are attached to vertical supports 333 that are mounted on the linier bearings. |
| 329 | Cap at the bottom of the quick release skewer lock 356. The cap secures a cone shaped tapered bearing 359. |
| 330 | Foot mounts |
| 331 | Ski foot base |
| 333 | Vertical supports that are used to attach foot mounts 330 |
| 334 | Mounting members that together with foot mounts 330 form cradles that are part of the ski module. |
| 337 | Horizontal resistance springs to modulate horizontal rotational movements of user platform 346 around the vertical axis B-B |
| 338 | Mounting members that attach horizontal resistance springs 337 to the base 350 |
| 339 | Spring adjuster (including a crank or other mechanism) adjusting the length of horizontal resistance springs 337 |
| 340 | Support post - interface between base 350 and user platform 346. The support post 340 consists of a vertical column section and horizontal cross bar section mounted on top of the vertical column section. The support post 340 rotates in the horizontal plane around the vertical axis B-B by means of the central horizontal pivot 342. The support post 340 and central horizontal pivot 342 under it are mounted on horizontal support mount 352 or they can be mounted directly on base 350. |
| 342 | Central horizontal pivot - creates rotation of the support post 340 (and user platform 346 attached to it) in horizontal plane around the vertical axis B-B. The central pivot can be located either below or inside the vertical column section of the support post 342 or between the cross bar and vertical column sections of the support post 340. |
| 344 | Vertical pivots - creates lateral tilt or pivot of the user platform 346 around the horizontal A-A axis |
| 346 | User platform |
| 348 | Dampening piston struts-dampers to modulate horizontal rotational movements of user platform 346 around the vertical axis B-B |
| 350 | Base to which horizontal support mount 352, support post 340 and associated other parts above are mounted. The base may include wheels on one side for transport & storage. |
| 352 | Horizontal support mount for the support post 340 & associated other parts above |
| 354 | Mounting arms with holes or slits to attach dampers springs, elastic bands, or other types of resistance as further described herein to control resistance of horizontal movement of the device around the vertical B-B axis. The mounting arms can also be used to attach safety rails, handles, bars or poles. |
| 355 | Metered board with recessed cone-shaped holes designed for housing the quick release skewer lock 356 |
| 356 | Quick release skewer lock 356 |
| 357 | Bushing included within the shuttle with flanges 358 to reduce the freedom of movement of the pin of the quick release skewer lock 356. |
| 358 | Shuttle with flanges that travels within the slit 370 along the middle of the top plate 360. |
| 359 | Tapered bearing that travels within the slit 326 along the middle of the bottom plate 364 |

| Part No. | Element |
|---|---|
| 360 | Top plate that includes mounting arms 354, elongated section with slit 370 along the middle and a semi-circular slit 368 |
| 362 | A knob with roller pin that travels through slit 370 and through slit 326 along the middle of the top plate 360 and bottom plate 364 |
| 364 | Bottom plate with a slit 326 along the middle of that plate |
| 365 | Two posts attached at the end of the bottom plate 364 with a horizontal bar 366 connecting the two posts 365 |
| 366 | Horizontal bar attached between the two posts 365 and connected to vertical bar and/or telescopic tube 367 |
| 367 | vertical bar and/or telescopic tube that connects the user platform 346 to the horizontal bar 366 and bottom plate 364 |
| 368 | Semi-circular slit in the top plate 360 |
| 369 | Pivot post attached to support base 374. Bottom plate 364 (located under the top late 360) is attached to and rotates around the pivot post 369 |
| 370 | Slit along the middle of the elongated section of top plate 360 |
| 371 | Supporting roller is installed at the end of bottom plate 364 to support it when it rotates around the pivot post 369. The supporting roller rolls on top of the horizontal roller plate 373 in semi-circular motion. |
| 373 | Horizontal roller plate |
| 374 | Support base that supports one end of the bottom plate 364. Pivot post 369 is attached to the support base 374 |
| 375 | Loop with bearing at the bottom of the vertical bar and/or telescopic tube 367. Horizontal bar 366 is threaded through the loop with bearing 375 |
| 383 | Potentiometer on top of the support post 340 or on top of the connection that connects the support post 340 to central horizontal pivot 342 |

FIGS. 31-34

| Part No. | Element |
|---|---|
| 400 | Exercise device |
| 430 | Foot mounts |
| 440 | Support post - interface between base 450 and user platform 446. The support post 440 consists of a vertical column section and horizontal cross bar section mounted on top of the vertical column section. The support post 440 rotates in the horizontal plane around the vertical axis B-B by means of the central horizontal pivot 442. The support post 440 and central horizontal pivot 442 under it are mounted on horizontal support mount 452 or they can be mounted directly on base 450. |
| 442 | Central horizontal pivot - creates rotation of the support post 440 (and the user platform 446 attached to it) in horizontal plane around the vertical axis B-B. The central pivot can be located either below or inside the cross bar/mid platform support or between the vertical column and cross bar sections of the support post 440. |
| 444 | Vertical pivots - creates lateral tilt or pivot of the user platform 446 around the horizontal axis A-A |
| 446 | User platform |
| 450 | Base to which horizontal support mount 452, support post 440 and associated other parts above are mounted. The base may include wheels on one side for transport & storage. |
| 452 | Horizonal support mount for the support post 440 & associated other parts above |
| 454 | Mounting arms with holes or slits to attach dampers springs, elastic bands, or other types of resistance as further described herein to control resistance of horizontal movement of the device around the vertical axis B-B. The mounting arms can also be used to attach safety rails, handles, bars or poles. |
| 465 | Two posts attached at the end of top plate connected with horizontal bar 466 |
| 466 | Horizontal bar attached between the two posts 465 and connected to vertical bar and/or telescopic tube 467 |
| 467 | Vertical bar and/or telescopic tube that connects the user platform 446 to the horizontal bar 466 and plate 476 |
| 475 | Loop with bearing at the bottom of vertical bar and/or telescopic tube 467. Horizontal bar 466 is threaded through the loop with bearing 475 |
| 476 | Plate that rotates around the vertical pin or bolt 479 and connected on one side to mounting arms 454 or to the support post 440 and on the other side to vertical bar and/or telescopic tube 467. Plate 476 may have a roller at the bottom to support it when it rotates around vertical pin or bolt 479. |
| 477 | Horizontal bar connecting plate 476 to mounting arms 454 or to the support post 440. Horizontal bar may also be used to connect plate 776 to vertical bar and/or telescopic tube 467 and user platform 446 (as in FIGS. 32-34). |
| 478 | Slit on plate 476 along which the horizontal bar 477 moves once it is shifted along the openings or slit in the mounting arms 454 |
| 479 | Vertical pin or bolt that attaches plate 476 to the base 452 or directly to platform 450. Plate 476 pivots around the vertical pin or bolt 479. |

FIGS. 35-38

| Part No. | Element |
|---|---|
| 500 | Exercise device |
| 530 | Foot mounts |
| 540 | Support post - interface between base 550 and user platform 546. The support post 540 consists of a vertical column section and horizontal cross bar section mounted on top of the vertical column section. The support post 540 rotates in the horizontal plane around the vertical axis B-B by means of the central horizontal pivot 542. The support post 540 and central horizontal pivot 542 under it (eg as shown on FIG. 36) are mounted on horizontal support mount 552 or they can be mounted directly on base 550. |
| 542 | Central horizontal pivot - creates rotation of the support post 540 (and user platform 546 attached to it) in horizontal plane around the vertical axis B-B. The central pivot can be located either below or inside the vertical column section of the support post 542 or between the cross bar and vertical column sections of the support post 540. |
| 544 | Vertical pivots - create lateral tilt or pivot of the user platform 546 around the horizontal A-A axis |
| 546 | User platform |
| 550 | Base to which horizontal support mount 552, support post 540 and associated other parts above are mounted. The base may include wheels on one side for transport & storage. |
| 551 | Transverse mounting plates (as shown on FIG. 38) attached to base 550 (for purposes of attaching the fixed vertical support plates 595) |
| 552 | Horizontal support mount for the support post 540 & associated other parts above |
| 554 | Mounting arms with holes or slits to attach dampers (not shown on FIGS. 35-38 but similar to dampers 248 or 348 shown herein) springs, elastic bands, or other types of resistance as further described herein to control resistance of horizontal movement of the device around the vertical B-B axis. The mounting arms can also be used to attach safety rails, handles, bars or poles. |
| 590 | Arc guide ramps, rails or tracks for transverse rotational movements |
| 591 | Horizontal cross-piece (as shown on FIG. 38) connecting the two arc guide ramps, rails or tracks 590 into a unified structural element |
| 592 | Bearing wheels (rollers) mounted to 546 for effecting transverse rotational movements |
| 593 | Pivoting linkage arms (as shown on FIG. 38) attached to the outer edges of arc guide ramps, rails or tracks 590 |
| 594 | Lever arms (to effect an up & down vertical movement for the arc guide ramps, rails or tracks 590) |
| 595 | Fixed vertical support plates for purposes of installing the pivoting linkage arms 593 |
| 596 | Pivots for 594 |
| 597 | Upper pivot point for the relationship between 593 and 595 |
| 598 | Mounting member for the lever arms 594 and pivots 596 |
| 599 | Slit at the bottom of 595 limiting means for the travel of pivoting linkage arms 593 |

FIGS. 39 through 40

| Part No. | Element |
|---|---|
| 600 | Exercise device |
| 630 | Foot mounts |
| 640 | Support post - interface between base 650 and user platform 646. The support post rotates in various directions (including in the horizontal plane around the vertical axis B-B and vertical plane around the horizontal axis A-A) by means of the spherical bearing/ball joint 684. The support post 640 is mounted on the horizontal support mount 652 or it can be mounted directly on base 650. |
| 646 | User platform |
| 650 | Base to which horizontal support mount 652, support post 640 and associated other parts above are mounted |
| 652 | Horizontal support mount for the support post 640 & associated other parts above |
| 654 | Mounting arms with holes or slits to attach dampers (not shown on FIGS. 41-42 but similar to dampers 248 and 348 shown on FIGS. 8-30) springs, elastic bands, or other types of resistance as further described herein to control resistance of horizontal movement of the device around the vertical B-B axis. The mounting arms can also be used to attach safety rails, handles, bars or poles. |
| 660 | Top plate that includes mounting arms 654 and elongated section with slit in the middle and a semi-circular slit (not shown) |
| 662 | A knob with roller pin that travels through slits along the middle of the top plate 660 and bottom plate 664 |
| 664 | Bottom plate with a slit along the middle of that plate (not shown). Bottom plate 664 is located under the top late 660 is attached to and rotates around the pivot post (not shown) that is connected to the support base 674. |

-continued

| Part No. | Element |
|---|---|
| 665 | Two posts attached at the end of the top late 660 with a connection bar 666 |
| 666 | Horizontal bar attached between the two posts 665 and connected to vertical bar/telescopic tube 667 through the loop with bearing 675. |
| 667 | Vertical bar and/or telescopic tube that connects the user platform 646 to the bottom plate 664 through the horizontal bar 666. |
| 675 | Loop with bearing at the bottom of vertical bar and/or telescopic tube 667. Horizontal bar 666 is threaded through loop with bearing 675 |
| 684 | Spherical bearing/ball joint installed between the support post 640 and the user platform 646. The spherical bearing/ball joint 684 can also be installed between the support post 640 and the horizontal support mount 652 or base 650. |

FIGS. 41-43

| Part No. | Element |
|---|---|
| 700 | Exercise device |
| 705 | Alternator |
| 706 | Alternator shaft |
| 707 | Top and bottom alternator pulleys or sprockets |
| 708 | Alternator mounting members |
| 709 | Gear mounting member |
| 711 | Central pulley or sprocket |
| 712 | Central belt |
| 713 | Gear carrier post |
| 714 | Gear pulley or sprocket |
| 715 | Drive pulley or sprocket |
| 716 | Planetary pulley or sprocket |
| 717 | Top alternator belt |
| 718 | Bottom alternator belt |
| 703 | Rails or tracks that are used in conjunction with the linear bearings 728 that allow the foot mounts 730 to slide horizontally |
| 704 | Support plates that are used for purposes of mounting the linear bearings 728, rails 703 and foot mounts 730. |
| 726 | Slit along the middle of bottom plate 764 |
| 727 | Pivots that are used to attach the foot mounts 730 to vertical supports 733 |
| 728 | Linear bearings that slide horizontally on rails or tracks 703. Foot mounts 730 are attached to vertical supports 733 that are mounted on the linier bearings 728. |
| 730 | Foot mounts |
| 731 | Ski foot base |
| 733 | Vertical supports that are used to attach foot mounts 730 |
| 734 | Mounting members that together with foot mounts 730 form cradles that are part of the ski module. |
| 740 | Support post - interface between base 750 and user platform 746. The support post 740 consists of a vertical column section and horizontal cross bar section mounted on top of the vertical column section. The support post rotates in the horizontal plane around the vertical axis B-B by means of the central horizontal pivot 742. The support post and central horizontal pivot 742 under it are mounted on horizontal support mount 752 or they can be mounted directly on base 750. |
| 742 | Central horizontal pivot - creates rotation of the support post 740 (and of the user platform 746 attached to it) in horizontal plane around the vertical axis B-B. The central pivot can be located either below or inside the vertical column section of the support post 740 or between the cross bar and vertical column sections of the support post 740. |
| 744 | Vertical pivots - create lateral tilt or pivot of the user platform 746 around the horizontal axis A-A |
| 746 | User platform |
| 750 | Base to which horizontal support mount 752, support post 740 and associated other parts above are mounted. The base may include wheels on one side for transport & storage. |
| 752 | Horizontal support mount for the support post 740 & associated other parts above |
| 754 | Mounting arms. The mounting arms 754 can be used to attach safety rails, handles, bars or poles. |
| 760 | Top plate that includes mounting arms 754 and elongated section with slit 770 along the middle and a semi-circular slit (not shown) |
| 762 | A knob with roller pin that travels through slit 770 and through slit 726 along the middle of the top plate 760 and bottom plate 764 respectively |
| 764 | Bottom plate with a slit 726 along the middle of that plate. The bottom plate 764 is supported on one end by the support base with the pivot post (not shown but similar to the support base 374 and pivot post 369 described herein). The bottom plate 764 is supported on the other end by the supporting roller 771. The bottom plate 764 rotates around the pivot post (not shown but similar to the pivot post 369 described herein). |

| Part No. | Element |
| --- | --- |
| 765 | Two posts attached at the end of the bottom plate 764 with a horizontal bar 766 connecting the two posts 765 |
| 766 | Horizontal bar attached between the two posts 765 and connected to vertical bar and/or telescopic tube 767 |
| 767 | Vertical bar and/or telescopic tube that connects the user platform 746 to the horizontal bar 766 and bottom plate 764 |
| 770 | Slit along the middle of the elongated section of top plate 760 |
| 771 | Supporting roller installed at the end of bottom plate 764 to support it when it rotates around the pivot post (not shown but similar to the pivot post 369 described herein). The supporting roller rolls on top of the horizontal roller plate 773 in semi-circular motion. |
| 773 | Horizontal roller plate |
| 775 | Loop with bearing at the bottom of the vertical bar and/or telescopic tube 767. The horizontal bar 766 is threaded through the loop with bearing 775 |
| 783 | Potentiometer on top of the support post 740 or on top of the connection that connects the support post 740 to central horizontal pivot 742 |

The invention claimed is:

1. A multipurpose exercise device for replicating exercise motions for sports and physical therapy, comprising:
   a. a base having an upper surface and lower surface, the lower surface resting on a horizontal support surface;
   b. a perpendicular support post having an upper end and a lower end, the lower end of the support post mounted directly to the base, the support post capable of pivoting around a vertical axis;
   c. a user platform including:
      i) a horizontal cross-bar mounted directly onto the upper end of the support post that axially pivots only in a horizontal plane around the vertical axis passing through the support post, wherein the horizontal cross-bar has a first end and a second end with a vertical pivot on each end, each end being equidistant from the support post;
      ii) a foot mount upon which a user stands mounted to each vertical pivot on each end of the horizontal cross-bar to enable each foot mount to axially pivot only in a vertical plane around a horizontal axis, the foot mounts suspended above the base;
      wherein a user's feet are positioned on the foot mounts to selectively drive the user platform to pivot with the horizontal cross-bar in a horizontal plane around the vertical axis and parallel to the horizontal support surface, and to drive the user platform to rotate on the vertical pivots attached to the horizontal cross-bar in a vertical plane around the horizontal axis and perpendicular to the horizontal support surface;
   d. a first set of plurality of elongated resistance elements, each elongated resistance element having a first end and a second end, the first end mounted to the support post and the second end mounted to the base, the plurality of elongated resistance elements control the level of resistance of the user platform in the horizontal plane without supporting the user platform;
   e. a second set of a plurality of elongated resistance elements, each elongated resistance element having a first end and a second end, the first end mounted to the base or to the support post and the second end mounted to the user platform to control the level of resistance the user platform in the vertical plane without supporting the user platform;
   wherein the user stands on the foot mounts and performs exercise motions to propel the user platform to pivot in the horizontal plane around the vertical axis and parallel to the horizontal support surface, and in a vertical plane around the horizontal axis and perpendicular to the horizontal support surface.

2. The multipurpose exercise device of claim 1, further comprising at least one dampening element having a first end and a second end, the first end mounted to the support post and the second end mounted to the base to control the level of resistance of the user platform in the horizontal plane.

3. The multipurpose exercise device of claim 1, wherein the first set of plurality of resistance elements is horizontal.

4. The multipurpose exercise device of claim 2, wherein the at least one dampening element is adjustable to further control the level of resistance of the user platform in the horizontal plane.

5. The multipurpose exercise device of claim 1, further comprising at least one dampening element having a first end and a second end, the first end mounted to the user platform and the second end mounted to the base to control the level of resistance of the user platform in the vertical plane.

6. The multipurpose exercise device of claim 1, wherein the user platform is in digital communication with a computer processing unit for transmitting position and motion data to the computer processing unit for processing into an interactive experience for the user.

7. The multipurpose exercise device of claim 6, wherein the interactive experience is a video game.

8. The multipurpose exercise device of claim 6, wherein the interactive experience is data compilation on the exercise motions.

9. The multipurpose exercise device of claim 1, wherein in the first set of plurality of elongated resistance elements at least one of the plurality of elongated resistance elements is adjustable to further control the resistance of the user platform in the horizontal plane, and
   wherein in the second set of plurality of elongated resistance elements at least one of the plurality of elongated resistance elements is adjustable to further control the resistance of the user platform in the vertical plane.

* * * * *